(12) United States Patent
Swann

(10) Patent No.: US 9,650,968 B2
(45) Date of Patent: May 16, 2017

(54) AIRCRAFT ENGINE FUEL SYSTEM

(71) Applicant: ROLLS-ROYCE PLC, London (GB)

(72) Inventor: Peter Swann, Nottingham (GB)

(73) Assignee: ROLLS-ROYCE plc, London (GB)

(*) Notice: Subject to any disclaimer, the term of this patent is extended or adjusted under 35 U.S.C. 154(b) by 298 days.

(21) Appl. No.: 14/486,563

(22) Filed: Sep. 15, 2014

(65) Prior Publication Data

US 2015/0100220 A1    Apr. 9, 2015

(30) Foreign Application Priority Data

Oct. 8, 2013 (GB) .................................. 1317732.4

(51) Int. Cl.
*F02C 1/00* (2006.01)
*F02C 9/28* (2006.01)
(Continued)

(52) U.S. Cl.
CPC .................. *F02C 9/28* (2013.01); *F02C 3/20* (2013.01); *F02C 7/22* (2013.01); *F02C 9/40* (2013.01);
(Continued)

(58) Field of Classification Search
CPC .... F02C 7/22; F02C 7/222; F02C 9/26; F02C 9/28; F02C 9/40; F05D 2270/311; F05D 2270/312; F05D 2270/313; F23C 1/08; F23R 3/36
See application file for complete search history.

(56) References Cited

U.S. PATENT DOCUMENTS 5,005,355 A * 4/1991 Singh ...................... C11D 3/43
239/2.1
2008/0072577 A1   3/2008 Taylor et al.
(Continued)

FOREIGN PATENT DOCUMENTS

CN         102926874 A    2/2013
EP         2 677 138 A2   12/2013
(Continued)

OTHER PUBLICATIONS

Papameletiou et al., "Aviation Fuels: Annex 1b to the Final Report of the SCOEL Support Project," Sep. 2012, pp. 1-88.
(Continued)

*Primary Examiner* — Gerald L Sung
*Assistant Examiner* — Katheryn Malatek
(74) *Attorney, Agent, or Firm* — Oliff PLC

(57) ABSTRACT

This invention concerns a method of delivering fuel to an aircraft engine 60, which involves providing a plurality of distinct fuel sources 20, 22, a first fuel source 20 comprising a first fuel having a first aromatic content and a second fuel source 22 comprising a second fuel having a second aromatic content. One or more ambient atmospheric condition is determined for at least a portion of a flight path of the aircraft, said condition being indicative of a likelihood of contrail 135 formation by the engine 60. A desirous fuel composition for combustion by the engine is determined based upon the one or more ambient atmospheric condition and a ratio of the first and second fuels from said respective fuel sources is selected according to said desirous fuel composition. The selected ratio of the first and second fuels is delivered to the aircraft engine 60.

13 Claims, 13 Drawing Sheets

(51) Int. Cl.
*F02C 3/20* (2006.01)
*F02C 7/22* (2006.01)
*F02C 9/40* (2006.01)
*F02C 9/26* (2006.01)

(52) U.S. Cl.
CPC ............ *F02C 9/26* (2013.01); *F05D 2270/08* (2013.01); *F05D 2270/311* (2013.01); *F05D 2270/312* (2013.01); *F05D 2270/313* (2013.01); *Y02T 50/671* (2013.01); *Y02T 50/677* (2013.01)

(56) References Cited

U.S. PATENT DOCUMENTS

| | | |
|---|---|---|
| 2009/0013591 A1 | 1/2009 | Bradin et al. |
| 2010/0122519 A1* | 5/2010 | Epstein ............... F02C 3/20 |
| | | 60/39.461 |
| 2010/0132330 A1* | 6/2010 | Noppel ............... F01D 25/30 |
| | | 60/39.5 |
| 2013/0173074 A1* | 7/2013 | Chandler ............ F02C 9/40 |
| | | 700/287 |
| 2013/0343958 A1 | 12/2013 | Swann |

FOREIGN PATENT DOCUMENTS

| | | |
|---|---|---|
| EP | 2 677 139 A2 | 12/2013 |
| EP | 2 685 280 A2 | 1/2014 |

OTHER PUBLICATIONS

Feb. 27, 2015 Search Report issued in European Application No. 14184758.
May 9, 2014 Search Report issued in United Kingdom Application No. 1317732.4.

\* cited by examiner

AIRCRAFT ENGINE FUEL SYSTEM

BACKGROUND OF THE INVENTION

The present invention relates to a fuel system, and more particularly a fuel system for aiding the prevention of the formation of contrails.

Contrails, also known as condensation trails or vapour trails, are line-shaped ice-clouds that appear behind aircraft under certain circumstances. The formation of a contrail depends on a number of factors, including: ambient temperature, humidity and pressure; the efficiency of the aircraft's engines; and the properties of the fuel burned in the engines.

A contrail, once formed, will typically dissipate within a minute or so, unless the ambient air is supersaturated with respect to ice, in which case the contrail may persist. A persistent contrail will grow over time to resemble natural cirrus cloud, both in size and optical properties, and is referred to as "contrail-cirrus". Line-shaped contrails and contrail-cirrus are collectively referred to as "aviation-induced cloudiness" (AIC).

It has been found that contrail formation may be affected by the properties of the fuel that is burned in the engine of an aircraft. Kerosene and other hydrocarbon fuels typically contain a wide variety of types of molecule, characterised by their sizes (number of carbon atoms) and shapes. Some common molecule shapes include: chain-shaped molecules (paraffins), chains with branches (iso-paraffins), and chains wrapped into rings (cyclo-paraffins). Also common within many hydrocarbon fuels is the family of molecules known as "aromatics", which are also ring-shaped but possess different properties from the cyclo-paraffins.

There is anticipation in the aviation industry of a trend towards the use of fuels with a lower aromatic content, as a low aromatic content may provide many benefits, such as a higher specific energy, lower soot emissions, and lower $CO_2$ emissions relative to fossil kerosene.

Although lower aromatic fuels may have a number of advantages over fossil kerosene, their incorporation into jet fuel nonetheless presents a problem regarding the susceptibility of an engine to the formation of contrails, since the lower aromatic content of the fuel means that the ratio of water-vapour-to-heat added by the engine to the exhaust plume is increased. This enables the formation of contrails over a wider range of atmospheric conditions, resulting in increased prevalence of contrails.

Depending on the metric employed, the climate-warming impact of aviation-induced cloudiness may be of a similar magnitude to that of the CO2 emitted by aircraft, and may therefore represent a significant element of aviation's total climate impact. The suppression of contrail formation, and particularly the suppression of persistent contrails, therefore represents a compelling opportunity for a significant reduction in the overall climate warming impact of aviation.

"On conditions for contrail formation from aircraft exhausts", Meteorol Z, N F 5, Schumann (1996) discusses the relevance of fuel properties to the formation of contrails, and in particular that fuels such as liquefied natural gas or hydrogen are more susceptible to contrail formation than kerosene.

US2008/0072577A (Rolls-Royce) describes the suppression of contrail formation through the removal of water vapour from the exhaust, making use of a heat-exchanger and condenser arrangement which is integrated with intercooling and recuperation. US2010/0132330A (Rolls-Royce) proposes the attempted suppression of contrail formation through the use of directed electromagnetic energy which is applied to the engine's exhaust plume. Each of these methods may however result in a significant weight penalty for the engine. Furthermore, the latter example would also need to draw power thereby reducing fuel efficiency and, particularly for military applications, the emission of electromagnetic radiation may have the undesirable effect of increasing aircraft detectability.

Other solutions include eliminating some or all contrail formation and/or persistence through routing aircraft around/above/below regions of air susceptible to contrail formation and/or persistence, yet such a solution results in a wide variety of further issues to be solved. For example, rerouting of aircraft to avoid regions prone to contrail persistence may cause associated air traffic control complications as well as the increased fuel burn involved in climbing or otherwise increasing the distance travelled by an aircraft and/or flying at a non-optimal cruise altitude.

It is therefore an object of the present invention to reduce and/or eliminate the formation of contrails by aircraft engines in a manner that mitigates or avoids some or all of the problems that result from the prior art methods discussed above. It may be considered an additional or alternative aim of the present invention to reduce the production by aircraft engines of pollutants such as soot which may adversely impact local air quality around airports. It may be considered an additional or alternative aim to provide a system for aircraft engine contrail suppression which can operate more efficiently or effectively than the prior art.

BRIEF SUMMARY OF THE INVENTION

According to a first aspect of the invention there is provided a method of delivering fuel to an aircraft engine, comprising: providing a plurality of distinct fuel sources, a first fuel source comprising a first fuel having a first aromatic content and a second fuel source comprising a second fuel having a second aromatic content; determining one or more ambient atmospheric condition for at least a portion of a flight path of the aircraft, said condition being indicative of a likelihood of contrail formation by the engine; determining a desirous fuel composition for combustion by the engine based upon said one or more atmospheric condition; selecting a ratio of the first and second fuels from said respective fuel sources according to said desirous fuel composition; and delivering said selected ratio of the first and second fuels to the aircraft engine.

The ambient atmospheric condition may comprise any or any combination of atmospheric pressure, temperature and/or humidity.

The plurality of distinct fuel sources may be carried on the aircraft and the selecting of said ratio of fuels is performed by a fuel regulator in the flow path between the fuel sources and the aircraft engine.

The selecting of said ratio of fuels may comprise either selecting one of the first or second fuels that most closely approximates the desirous fuel composition or selecting a blend of the first and second fuels at the selected ratio.

The determination of atmospheric condition may be an instantaneous or real-time determination of atmospheric condition by one or more sensor on the aircraft.

The determining of a desirous fuel composition may be made by a control unit on board the aircraft.

The determination of the atmospheric condition may comprise detection of a contrail formed downstream of the engine exhaust.

The plurality of distinct fuel sources may be provided on the ground and the determining of the ambient atmospheric condition comprises determining actual ambient conditions or predicting ambient conditions for a proposed flight path.

The blending of the first and second fuels may be performed prior to delivery of the final fuel composition to one or more tank on the aircraft.

The determining of a desirous fuel composition may comprises determining a desirous aromatic content of the fuel composition for delivery to the engine.

Preferably the determining of a desirous fuel composition comprises applying a predetermined threshold value of a fuel property for the desirous fuel composition, the threshold value comprising an average value of said property over an instance or period of use of the engine.

The average value may comprises an average lower threshold value, such that an instantaneous value of said fuel property is permitted to fall below said lower threshold provided the average value is equal to or greater than said threshold.

The determining of a desirous fuel composition may comprise applying a plurality of predetermined threshold values of a fuel property for the desirous fuel composition and determining a default fuel composition within said threshold values, wherein in the event that a determined desirous fuel composition for suppressing contrail formation by the engine falls outside of said predetermined threshold values, the default fuel composition is selected.

The determining of a desirous fuel composition comprises determining a ratio of the mass of water produced by burning a unit volume/mass of fuel to the energy released from burning said unit.

The determining of a desirous fuel composition comprises determining a threshold ratio of the mass of water produced by burning a unit volume/mass of fuel to the energy released from burning said unit, said threshold ratio being the threshold for non-formation of contrails under the determined atmospheric condition.

The first fuel may have a relatively lower aromatic content and a second fuel may have a relatively higher aromatic content, wherein a volume of the first fuel is calculated for delivery to the engine to satisfy one or more operational parameters of the engine other than contrail suppression and a volume of the second fuel is calculated for delivery to the engine to satisfy contrail suppression.

The one or more operational parameter may comprise one or more engine performance parameter or the reduction of one or more engine exhaust pollutants.

The volumes of the first and second fuels may be calculated in respect of the duration of a planned instance of use of the aircraft engine and the operational parameter and/or contrail suppression requirement is varied according to a flight phase or altitude of the aircraft.

A volume of a default fuel composition for a flight may be determined after determinations of the volumes of the first and second fuels required and wherein the total volume of fuel determined for a flight comprises a summation of the determined volumes of the first, second and default fuel compositions.

The default fuel composition may comprise a default ratio of the first and second fuels.

According to a second aspect of the invention there is provided a fuel delivery system for an engine, the system comprising: a fuel delivery regulator arranged to receive fuel from a plurality of fuel sources for supply to the engine; an ambient atmospheric condition sensor arranged to output a reading of atmospheric condition for one or more location of an aircraft flight path and to output a signal in dependence thereon, and a control unit arranged to receive said signal and control operation of the regulator based thereupon in order to vary the volume of respective fuels from the plurality of fuel sources supplied to the engine for a period of engine operation.

The fuel delivery system may further comprise one or more sensor arranged to output a reading of an engine operating parameter, wherein the control unit is arranged to receive said engine operating parameter reading and to control operation of the regulator in dependence thereon.

The engine operating parameter reading may comprise an engine efficiency indicator.

The engine is typically a propulsion engine such as a gas turbine engine, e.g. an axial flow engine.

Each fuel source may comprise a different fuel composition. The plurality of fuel compositions may each comprise a different aromatic content.

The supply of the desirous fuel composition may comprise varying the volume of fuels supplied to the engine from a plurality of fuel sources and may comprise varying the flow rate from the one or more sources. Varying the volume of fuels supplied to the engine from the plurality of fuel sources may comprise varying the ratio of fuels from the fuel sources. The ratio of fuels may comprise entirely one fuel, for example by way of switching fuel sources, or else a mixture of the fuels from the plurality of fuel sources. Thus varying the volume of fuels supplied may comprise switching between said fuel sources.

Ambient atmospheric condition sensor may be provided that comprise a plurality of sensors of the same or differing types. The ambient atmospheric condition sensor may comprise a pressure sensor. The ambient atmospheric condition sensor may comprise a temperature sensor. The ambient atmospheric condition sensor may comprise a water vapour pressure (i.e. humidity) sensor. The ambient atmospheric condition sensor may comprise a combination of any of the aforementioned sensors. In a further aspect of the invention, the system may not include the ambient atmospheric condition sensor per se but may be arranged to receive a signal therefrom or else a signal derived therefrom.

A signal output or reading of the ambient atmospheric condition sensor may be transmitted to a controller and/or other aircraft instrumentation.

The ambient atmospheric condition sensor may sense the ambient atmospheric conditions in a vicinity of an engine. For example, the ambient atmospheric condition sensor may be mounted on the aircraft and/or engine, typically on an exterior thereof.

The ambient atmospheric condition sensor may sense the ambient atmospheric conditions in a region located in the path of travel of the engine or aircraft. For example meteorological data may be collected remotely of the aircraft and transmitted to the controller. In one example, macroscopic meteorological data may be collected for the intended flight path of the aircraft such that the engine operation can be optimised for an entire flight, rather than by reacting only to instantaneous ambient sensor data.

The fuel delivery system may comprise the fuel sources. The plurality of fuel sources may or may not comprises two fuel sources.

Each of the plurality of fuel sources may comprise a fuel tank. Each of the plurality of fuel sources may comprise a network of fluidly interconnected tanks. The plurality of fuel sources may be in fluid communication with the regulator.

The fuel contained in at least one of the plurality of fuel sources may comprise kerosene. Each of the plurality of fuel sources may comprise a distinct composition of fuel. The fuel system may output a mixture comprising a proportion of each distinct fuel composition. Each distinct composition of fuel may have a different aromatic content. One fuel composition may comprise an aromatic content of 20% or higher. Each distinct composition of fuel may have an aromatic content of 30 or 40% or less. One fuel composition may comprise aromatic content in the range 8% to 25%. One fuel composition may comprise aromatic content of 25% or higher. One fuel composition may comprise aromatic content 20-25%. One fuel composition may comprise an aromatic content of 8% or lower. One fuel composition may comprise substantially zero aromatic content.

This provides the advantage of a mechanism to temporarily increase the aromatic content of fuel burned by the engine(s) at times when, in the absence of the invention's operation, contrails would form. In this way the use of low-aromatic fuel is enabled for the majority of flight-time, enabling the fuel-efficiency benefits and reduced soot benefits of those fuels to be realised, while mitigating the contrail-susceptibility downside associated with those low-aromatic fuels. Thus the aromatic content control allowed by the invention may minimise impact on air quality and may also compensate for a fuel-burn penalty caused as a result of attempting to suppress contrail formation.

The aromatic content of the fuel delivered to the engine may be increased in response to any or any combination of an ambient temperature threshold, a humidity/ice saturation threshold, a light level/intensity threshold, and/or a determination of the formation of contrails, e.g. persistent contrails, by the engine exhaust gases.

A regulator may comprise a fuel blender or mixer. The mixer may output a substantially homogeneous fuel mixture comprising the fuels from the plurality of fuel sources. The regulator may comprise an outlet. The regulator may comprise an outlet valve. The flow of fuel into the fuel blender or mixer may be controlled by a plurality of regulator valves.

The regulator may comprise a plurality of individual regulators. The regulator may comprise an individual regulator for each of the plurality of fuel sources. The regulator may comprise a plurality of regulators for each of the plurality of fuel sources. The regulator may comprise a regulator valve. The regulator may comprise a plurality of regulator valves. The regulator may comprise a regulator valve for each of the plurality of fuel sources.

The fuel delivery system may comprise a fuel injector. The fuel injector may be arranged to receive the fuel output from the regulator.

The control unit may comprise one or more computer processor. The control unit may comprise or be in communication with an engine control unit. The control unit may actuate a plurality of regulators. The control unit may be configured to receive a signal representing the total fuel flow required for the engine. The control unit may be configured to receive one or more signal from the cockpit of the aircraft.

The control unit may be configured to receive data concerning the composition of each of the distinct compositions of fuel.

The delivery system may further comprise one or more engine sensors, for example for determining one or more operational parameters for the engine. The engine sensor may be an engine efficiency sensor or a plurality of sensors outputting readings allowing the control unit to determine engine efficiency therefrom. The engine sensor may transmit a signal to the control unit. The engine sensor may transmit a signal to one or more aircraft instruments.

The controller may be configured to control the regulator(s) to deliver fuel to the engine according to one or more predetermined aromatic content threshold. An upper threshold may be an instantaneous threshold such that the controller will operate the regulator so as to prevent an aromatic content greater than the upper limit being delivered to the engine. A lower threshold may be an average threshold, for example determined over a period of use, such as one or more flight. Thus the controller may allow the aromatic content of the fuel mix delivered to the engine to fall below a lower threshold value either instantaneously or periodically in order to achieve a reduced level of exhaust emissions, for example in the landing and take-off (LTO) cycle.

The controller may adjust the aromatic content within the predetermined threshold(s) in order to achieve one or more control aims. A primary control aim may be contrail suppression. A secondary aim may be optimising engine efficiency. Accordingly the controller may optimise the aromatic content of the fuel to the engine only to the extent that it does not cause formation of persistent contrails under the sensed ambient atmospheric conditions.

The system may be configured to ensure that, when averaged over the flight cycle (or alternatively over a number of flight cycles), the aromatic content of the fuel supplied to the engines lies at or above a practical lower limit of for example 8%. However, rather than being distributed evenly across a volume of fuel burned, the fuel aromatic content may be biased towards periods of operation where it can be used to suppress contrail formation and hence to provide a material reduction in aviation's climate warming impact, and may be biased away from periods of operation where it would result in higher local levels of air pollution.

Wherever practicable, any of the essential or preferable features defined in relation to any one aspect of the invention may be applied to any further aspect. Accordingly the invention may comprise various alternative configurations of the features defined above.

BRIEF DESCRIPTION OF THE DRAWINGS

Practicable embodiments of the invention are described in further detail below by way of example only with reference to the accompanying drawings, of which.

DETAILED DESCRIPTION OF THE INVENTION

The invention derives from the premise that, prior to a flight, an aircraft is loaded with not one fuel type but a number of fuel types (most probably two fuel types), which differ from each other principally in their respective levels of aromatic content. Whilst aromatic content is used herein as one way of distinguishing between different fuels, it will be appreciated that the fuels differ for the purpose of the invention in their respective ratios of water produced to the amount of heat released upon combustion and/or the amount of soot produced per unit mass of fuel upon combustion. These fuels are stored separately (e.g. kept in separate tanks) and then blended as required to produce a resulting fuel composition which is supplied to the engines. The fuels are preferably blended, immediately before combustion within the engine, e.g. upon delivery from the tank to the engine.

Figure 1:
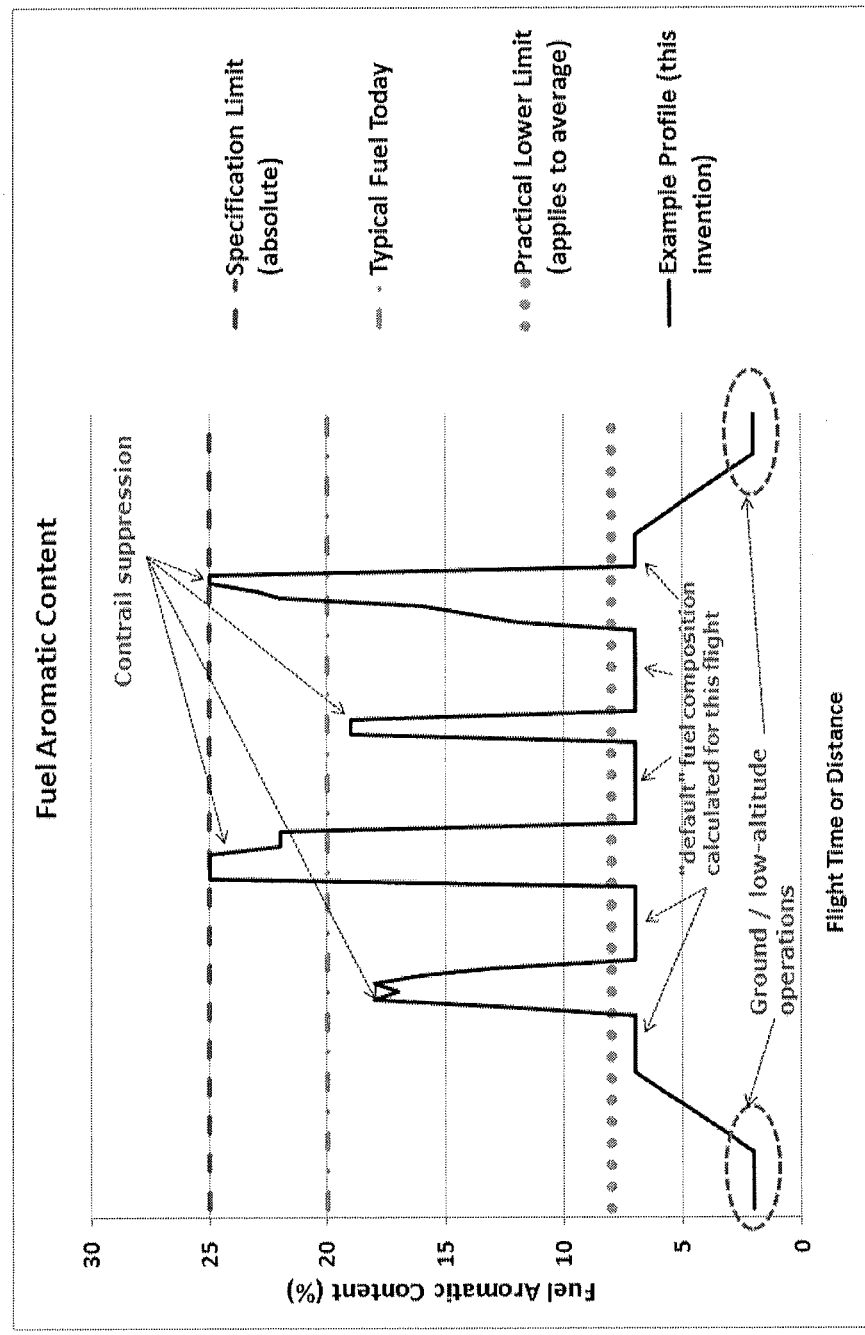
FIG. 1 shows a plot of fuel aromatic content delivered to an engine at different points of a flight in accordance with an example of the invention.

Turning firstly to FIG. 1, which shows an example scenario in which contrail suppression is required at certain points of a flight, there is shown a plot of fuel aromatic content delivered to the engine over the course of the flight. Here it can be seen that the aromatic content of the fuel is varied during engine operation, according to flight phase and/or ambient conditions and/or engine state and/or a contrail suppression policy. Ambient conditions could be sensed concurrently, e.g. on board, or predicted, for example using forecasts or other received data.

At relatively low altitude conditions, for example during take-off and/or initial climb and/or final descent and/or landing and/or ground-based operations, the engine is supplied with a fuel characterised by low aromatic content. At altitude, for example at cruise conditions, the controller adjusts the aromatic content to a default level which, in the example of FIG. 1, lies slightly below a desirous lower average limit for aromatic content for whole flight. The fuel composition is adjusted during the flight according to the need for contrail suppression (for example when flying in ice-supersaturated air under contrail-formation conditions). Additionally, the aromatic content may be adjusted to achieve low soot emissions (e.g. during the Landing/Take-Off (LTO) cycle).

During periods of contrail suppression, the aromatic content of the fuel composition is increased by the minimum extent necessary to suppress the formation of contrails behind the aircraft, thus avoiding unnecessarily high use of aromatic content. The resulting fuel composition is at all times subject to any regulatory (or technical) constraints concerning the maximum allowed value of aromatic content of fuel supplied to the engines. In the example of FIG. 1 aromatic contents up to and including an upper limit of 25% aromatic content are applied. Thus it can be seen that at various instances during the flight, where it is determined that contrails could form and that suppression of contrail formation is desirable according to a predetermined policy, the aromatic content is increased above the prescribed default level.

If the level of aromatic content required to achieve contrail suppression exceeds a predetermined upper limit the contrail-suppression action may be deemed unattainable and the engines may be supplied with the default fuel composition until such time as the required level of aromatic content falls within the permitted range, due for instance to a change in ambient conditions and/or engine efficiency, at which point the aromatic content may be adjusted accordingly.

The default fuel composition can be determined in dependence upon the anticipated requirement for contrail suppression to ensure that, on average, the aromatic content lies at or above the lower threshold. Thus the default fuel composition is calculated after the requirements for LTO cycle and for contrail suppression have been calculated or estimated.

A control system according to one example of the invention may implement, within periods of operation not corresponding to contrail suppression, for example when operating on the ground or at relatively low altitude (such as during the landing and take-off (LTO) cycle), a fuel supply to the engines whose aromatic content lies below a predetermined lower threshold, for example the currently-accepted practical lower limit of 8%. The fuel delivery system is configured to ensure that, when averaged over the flight cycle (or alternatively over a number of flight cycles), the aromatic content of the fuel supplied to the engines lies at or above the predetermined lower threshold, thus ensuring that elastomeric seals, etc continue to perform acceptably. However, rather than being distributed evenly across the entire volume of fuel burned, the fuel aromatic content is biased (1) towards periods of operation where it can be used to suppress contrail formation and hence to provide a material reduction in aviation's climate warming impact, and/or (2) away from periods of operation where it would result in higher local levels of air pollution. In this way the total amount of aromatic content burned by the engines across the full flight may be largely unchanged, and hence the fuel-burn penalty is negligible in spite of the lower energy release per unit mass of fuel burned for higher-aromatic content fuels.

The use of an average (rather than instantaneous) lower aromatic threshold opens up the possibility of improving local air quality (LAQ) around airports by using within the LTO cycle a final fuel composition characterised by an aromatic content of less than for example 8%.

Figure 2:
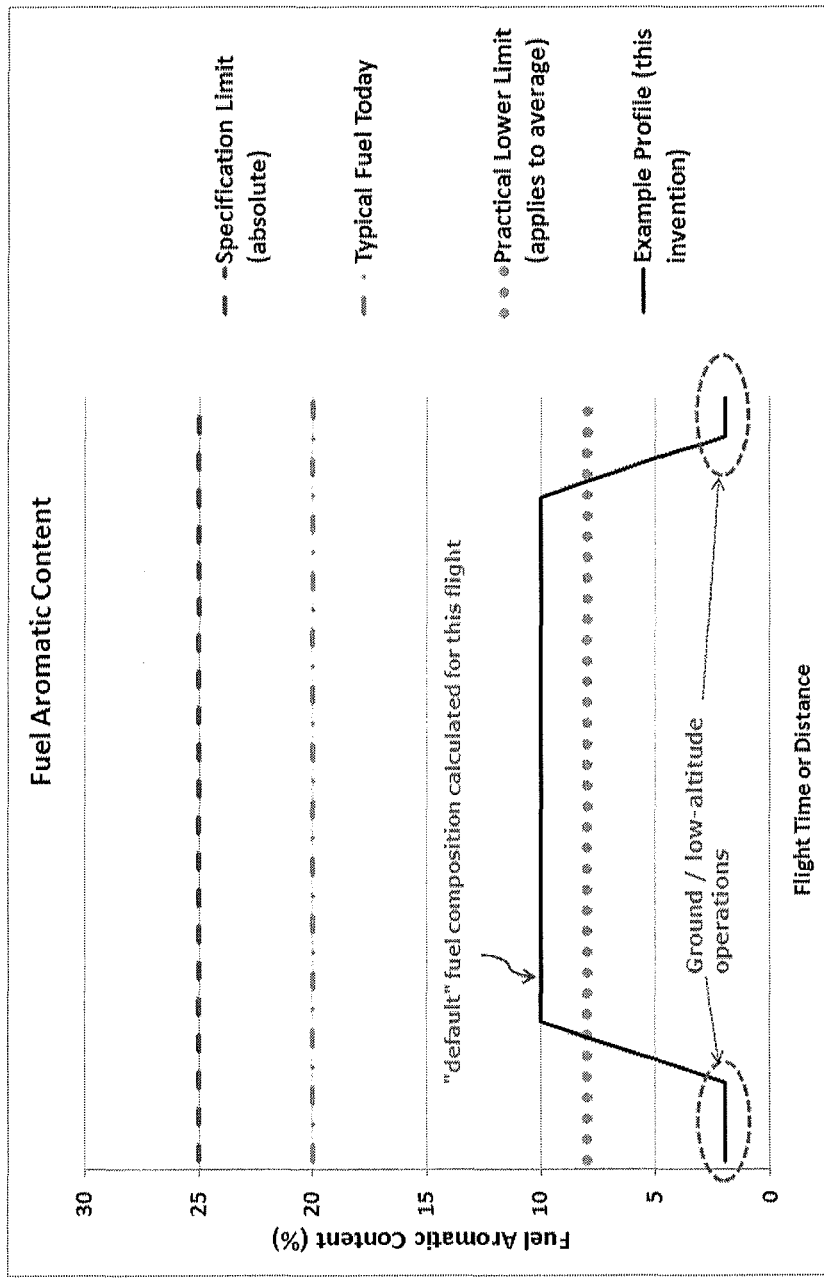
FIG. 2 shows a further plot of fuel content delivered to an engine under conditions in which ambient conditions do not warrant contrail suppression according to an adopted contrail suppression policy.

FIG. 2 illustrates an alternative scenario in which contrail suppression is not at any point within a flight required and/or deemed desirable according to a predetermined policy. In this case, since there are no periods of operation in which the fuel aromatic content is high (approaching 25%, say) then the aromatic content of the default fuel at altitude is set to be slightly higher than in FIG. 1 so as to maintain an average aromatic content at or above the minimum threshold, so as to allow significantly lower aromatic content during for example the LTO cycle. Thus if no contrail suppression were required for the flight, then the default fuel composition would lie above the minimum threshold.

Figure 3:
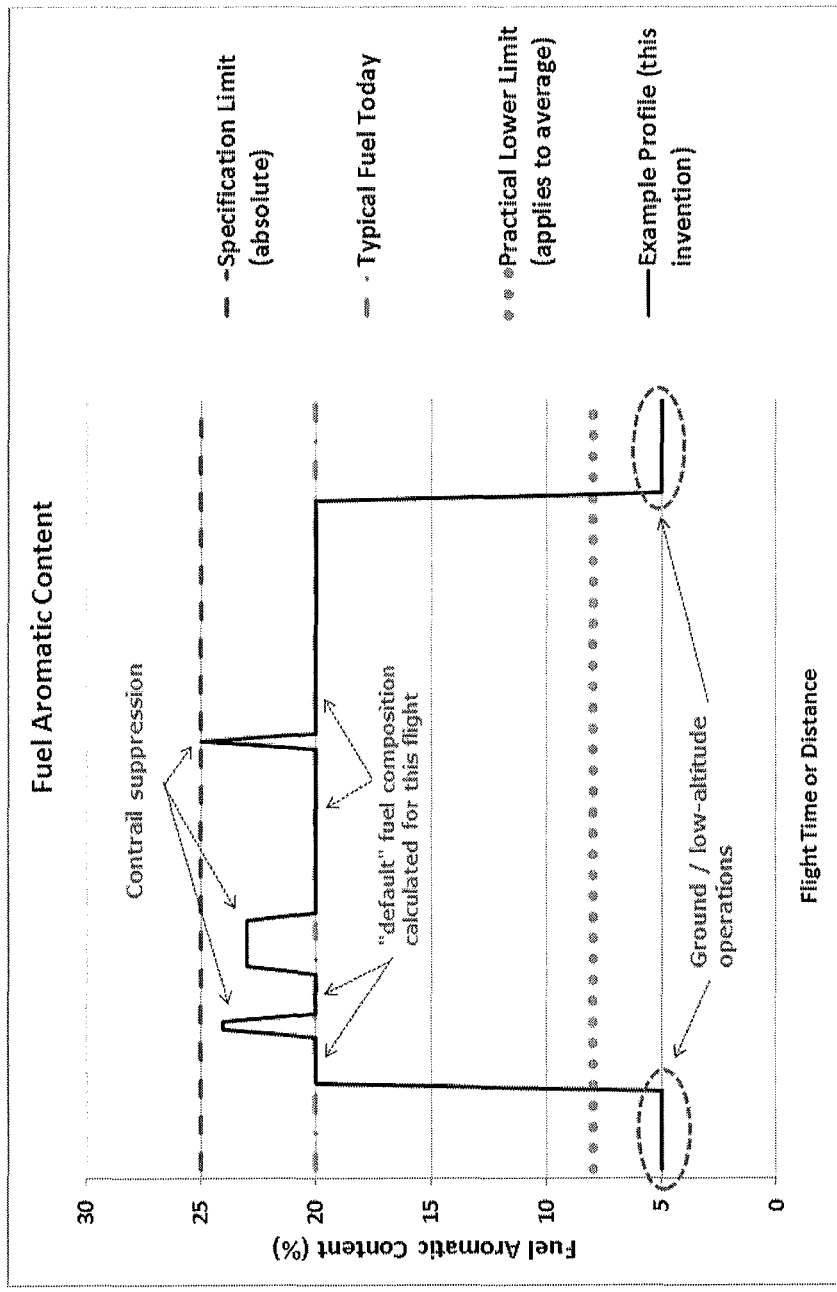
FIG. 3 shows a further plot of fuel content delivered to an engine in a scenario in which low-aromatic fuel is reserved exclusively for low-altitude and/or ground-based operation of the engine.

FIG. 3 illustrates a further scenario in which low-aromatic fuel (for example biofuel) is in shorter supply and/or is expensive relative to "standard" jet-fuel. In this scenario, the low-aromatic fuel may be prioritised for low-altitude and/or ground operations, while the default fuel composition may correspond substantially to "standard" jet fuel. A further fuel composition may be used in an "additive" capacity to raise, to the extent necessary according to the prevailing ambient conditions and engine operating point, the aromatic content of the fuel supplied to the engines at times when contrail suppression is required and can be achieved with the available fuel compositions without exceeding at any time the predetermined upper limit. In this scenario, the aromatic fuel content, averaged over the entire flight, lies substantially above the predetermined lower threshold.

The above described aims may be achieved in any one of three ways. Accordingly three different embodiments of the invention are described below in further detail.

A first embodiment involves the blending together, onboard the aircraft, of a number of distinct fluid compositions to produce a final fuel composition which is then supplied to the engines. The final fuel composition may at different times of the flight consist of i) exclusively any one of the distinct fluid compositions, or ii) a mixture of some or all the distinct fluid compositions.

In principle, in embodiment (ii) it is not required that each and every one of the distinct fluid compositions is compliant with applicable fuel-specifications, provided that the final fuel composition is at all times compliant. For instance, one of the distinct fluid compositions could be characterised by an aromatic content that lies above the maximum permitted level for use in an engine. Said fluid composition would then be used as an "additive" to one or more of the other fluid compositions in order to raise the aromatic content of the final fuel composition to the desired value, provided that the desired value was no greater than the maximum allowed value.

Figure 4:
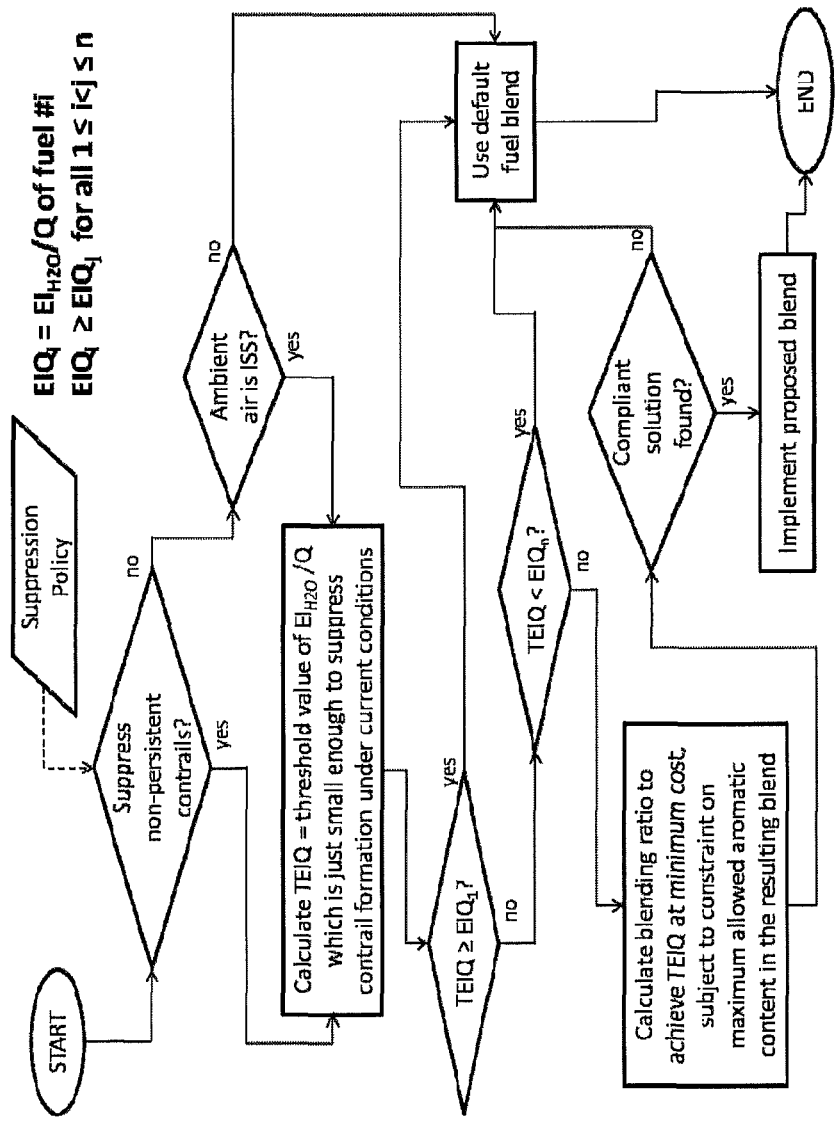
FIG. 4 shows a flow chart for a fuel delivery system control strategy according to one example of the invention.

FIG. 4 illustrates a decision making process relating to contrail suppression. The decision making process may be active during sections of the flight which lie outside for instance the LTO cycle. Additionally or alternatively the decision making process may be active at all periods during the flight. The decision making process leads to a determination of a blending ratio and hence the final fuel composition. The decision-making process is invoked whenever there is detected a material change in ambient conditions and/or in engine operating point. The decision making process takes into account the following factors Is contrail suppression required, according to a predetermined policy?

Is contrail suppression necessary, given the current ambient conditions and/or engine operating point?

If so, is the suppression of contrail formation achievable with the fuels available on the aircraft?

If so, can it be achieved without using a fuel composition whose aromatic content would lie above a predetermined upper threshold (for example 25%) set for example in applicable fuel specifications and/or regulations?

If so, does contrail suppression lie beyond the capability of the default fuel composition?

If any one of the above questions is answered "no", then the "default" fuel is used. If all questions are answered "yes" then a bespoke blending ratio is calculated and implemented. An example of such a method is described below.

Consider a set of n fluid compositions $\{C_i\}$, each individual composition being identified by use of a postfix, i, where $1 \leq i \leq n$.

For each individual fluid composition, let the ratio of $EIH_2O$ (mass of water produced by burning one unit mass of fluid) to Q (energy released from burning one unit mass of fluid) be denoted by $EIQ_i$.

A lower value of EIQ is advantageous in terms of reducing the range of circumstances in which a contrail will form.

Let the set of fluid compositions be ordered in descending order of EIQ such that $EIQ_i \geq EIQ_j$ for all i, j satisfying $1 \leq i < j \leq n$. In the (unlikely) event that two distinct fluid compositions exhibit the same value of EIQ, let the composition with the higher aromatic content be placed after that with the lower aromatic content.

As part of calculating the bespoke fuel blending ratio, the Threshold EIQ (TEIQ) is calculated. This is the largest value of EIQ which will not result in the formation of a contrail, given the prevailing ambient conditions and engine operating point. In other words, if EIQ were to increase above TEIQ, then a contrail would form. Optionally, a "contingency margin" is applied to the calculated value of TEIQ. The magnitude of the contingency margin is determined in dependence upon characterisation of sources of measurement and/or calculation error.

If $(TEIQ \geq EIQ1)$ then any blend of, or either of, the available distinct fluid compositions is sufficient to suppress contrails and so the default fuel composition is selected. Thus contrail formation is suppressed.

If $(EIQn > TEIQ)$ then there is no single fuel composition, nor any blend of the available fuel compositions that will result in contrail suppression, so the default fuel blend is selected to optimise considerations other than contrail formation.

If $(EIQ1 > TEIQ \geq EIQn)$ then the controller calculates the minimum cost fuel-blend that achieves TEIQ, subject to the constraint that the aromatic content of the final fuel composition arising from the proposed blending ratio must not exceed the predetermined upper threshold given in for example fuel-specification limits and/or regulations. If a solution is found which satisfies the constraint, it is implemented such that contrail formation is suppressed. If a constraint-satisfying solution cannot be found, the default fuel composition is used.

The default fuel composition refers to a fuel composition which is used when contrail suppression is either not possible or not required (and also when local air quality improvement is not required). The default fuel composition could be one of the distinct fluid compositions, or in the general case it could be a blend of two or more of the distinct fluid compositions.

Subject to satisfying constraints on the maximum permissible aromatic content of the final fuel composition (and any other specification-related constraints such as minimum permissible density), the default fuel could be the blend corresponding to lowest cost per unit of energy released from combustion, or alternatively the blend corresponding to the lowest environmental impact. An assessment of environmental impact would be influenced by a number of factors including the mass of $CO_2$ emitted per unit of energy released, and the mass of soot (or number of soot particles) emitted per unit of energy released. In general, fuels with lower aromatic content exhibit both lower $CO_2$ and lower soot emissions per unit of energy released. Thus, two options for assessing environmental impact could be implemented: 1) calculate explicitly the CO2 and soot emissions per unit of energy released for each proposed fuel blend and select the blend with the most favourable properties, or 2) select a blending ratio which results in the lowest aromatic content in the final fuel composition. Additionally or alternatively, other aspects, such as fuel sulphur content, could be taken account of when assessing environmental impact of a proposed fuel blend ratio.

In one example, in order to ensure that the lower limit on aromatic fuel content is satisfied over the flight as a whole, or over a group of flights, the default fuel composition is determined in dependence upon the expected contrail suppression requirement for the current flight. This calculation is performed actively on board the aircraft. Additionally or alternatively this calculation is performed in a remote facility, for example a ground-based facility, and communicated to the aircraft prior to the flight, for example based upon available meteorological data for the flight path of the aircraft.

Additionally or alternatively the default fuel composition is determined with reference to actual aromatic content burned on the previous flight of that same aircraft, optionally taking account of some estimate of the likely contrail suppression requirement for the current flight. For example, the default fuel composition on the current flight is set so as to compensate for the extent to which the average aromatic content of fuel burned on the previous flight lay above or below the predetermined lower threshold. The average aromatic content of the fuel burned on the previous flight may have differed materially from the predetermined lower threshold due to unexpected circumstances such as unplanned holding on the ground prior to takeoff (resulting in greater use of low aromatic fuel), or greater than expected requirement for contrail suppression (resulting in greater use of higher-aromatic fuel).

Additionally or alternatively the composition of the default fuel is adjusted as the flight progresses to take account of any differences between out-turn and expectation concerning the use either of low-aromatic fuel for example during the LTO cycle, or alternatively of high-aromatic fuel for contrail-suppression purposes. For example, if the aircraft encounters less ice-supersaturated air than was expected at the time of loading the aircraft with appropriate volumes of the distinct fuel compositions, then less of the high-aromatic fuel may be used for the purposes of contrail suppression, and so towards the end of the flight the default fuel aromatic content is increased to compensate for this. This allows the total amount of fuel carried for a flight to be minimised.

The criteria used to select the default fuel composition may be used to determine the volumes of each fuel supplied to the fuel tanks prior to take-off. In one example, the ground-based fuel delivery system could calculate the default fuel composition and then communicate to the aircraft the default fuel composition that should be used in flight when not performing contrail suppression.

The methodology for calculating the threshold value of ($EIH_2O/Q$) can be determined according to derivation of contrail critical temperature from contrail factor, which in turn is derived from fuel properties and engine total efficiency. Within the present invention, this process is inverted, first calculating the threshold contrail factor that will just result in contrail suppression at the current ambient conditions, and then calculating the ratio of ($EIH_2O/Q$) corresponding to that threshold value of contrail factor.

The calculation of threshold contrail factor could be performed analytically, iteratively, or by the use of a pre-populated lookup-table or database.

A second embodiment of the invention will now be described, which does not involve blending of the fuels on board the aircraft. This embodiment has the advantage that the fuel system is simpler in that it involves the switching between the distinct fluid compositions available on the aircraft. This embodiment therefore requires that each of the distinct fluid compositions loaded into the aircraft be compliant with all fuel specifications, for example such that each fuel composition lies at or below the predetermined upper threshold for aromatic content.

Figure 5:
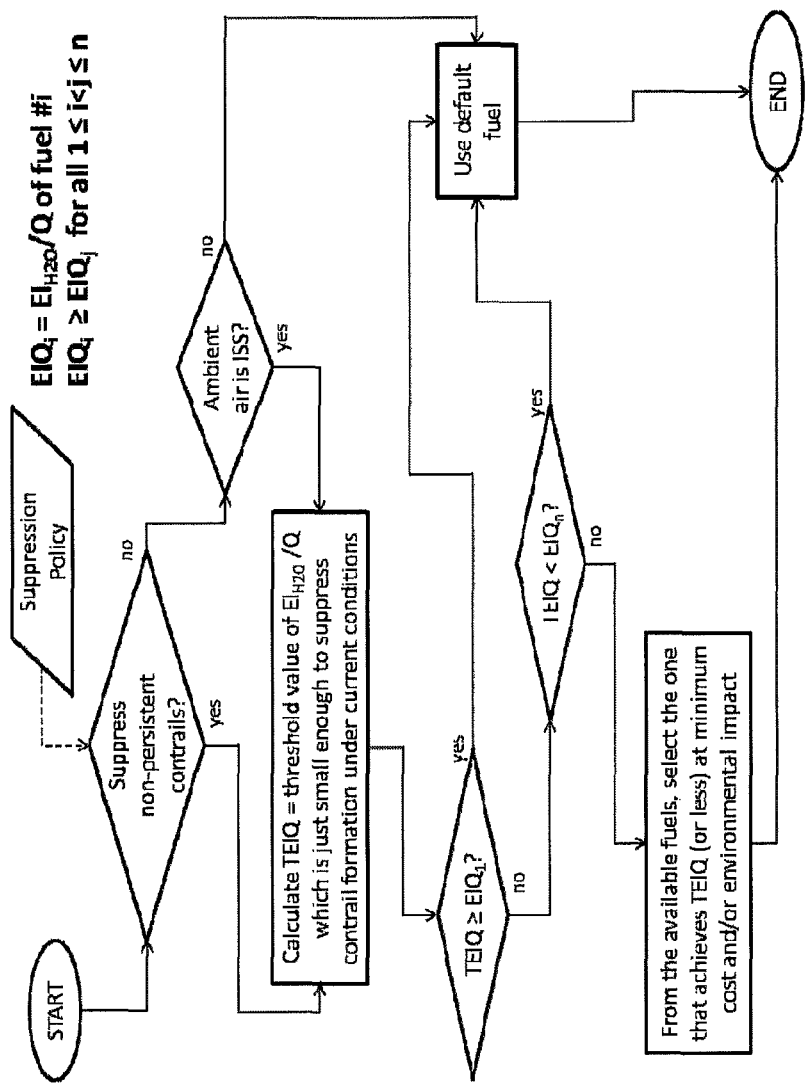
FIG. 5 shows a flow chart for a fuel delivery system control strategy according to another example of the invention.

FIG. 5 illustrates an example of the decision making process required to identify which of the available fuel compositions should be employed according to the second embodiment. As with the first embodiment, the decision-making process is invoked whenever there is a material change in ambient conditions or in engine operating point.

Where the process is the same as described above, the stages will not be repeated for conciseness. The key differences are that there is no need to check the aromatic content of the chosen fuel for compliance with fuel specifications because each and every one of the distinct fuel compositions is known to comply with fuel specs. Also, there is no calculation of blending ratio, but instead a simple choice between a subset of the available fuel compositions. The subset is defined as those fuel compositions characterised by an EIQ which is less than or equal to the threshold EIQ (i.e. the TEIQ as shown in the flowchart). As with the choice of default fuel discussed above, the choice may be informed by the cost and or environmental impact of the available fuels. For instance, for environmental purposes one could choose the fuel with the lowest aromatic content, leading to lower $CO_2$ emissions and soot emissions. Cost will be influenced by the price of the fuels themselves per unit of energy, plus any additional environmental costs.

Determination of the default fuel composition will not be on a sliding scale of aromatic content but rather one of the available fuels on board according to which fuel best matches the determined criteria. This selection of fuels need not be limited by EIQ considerations (since the default fuel may not aim to suppress contrails), and thus can be made from the entire range of distinct fuel compositions available on board the aircraft.

In this embodiment, the fuels carried by the aircraft may effectively comprise a default, lower aromatic content, fuel for normal use and a second, higher aromatic content fuel for contrail suppression. The second fuel may have aromatic content of say 20-25%. Optionally, the composition of the default fuel may be determined in dependence upon the composition and expected usage of the second fuel to ensure that the average aromatic content of the fuel burned over an entire flight is substantially equal to the lower predetermined threshold.

Additionally or alternatively, in this embodiment the fuels carried by the aircraft may effectively comprise a first fuel characterised by an aromatic content lying materially below the predetermined lower threshold, a second fuel characterised by an aromatic content greater than that of the first fuel and lying at or above the predetermined lower threshold and substantially below the predetermined upper threshold, and a third fuel characterised by an aromatic content greater than that of the second fuel and lying at or below the predetermined upper threshold.

Additionally or alternatively, in this embodiment the fuels carried by the aircraft may effectively comprise a plurality of fuels characterised by aromatic contents which differ materially from each other but all lie at or below the predetermined upper threshold and at least one lies above the predetermined lower threshold.

In a third embodiment, no fuel-blending or fuel-switching is performed on board the aircraft. As a result, there is no decision making to be performed on the aircraft and the aircraft engine can operate in a conventional manner. In this embodiment a determination of the composition of a single fuel type to be loaded onto the aircraft is made prior to a flight. The fuel composition will be tailored to one or any combination of the requirements of that particular flight; predetermined meteorological information for the flight path; historical data for the route, such as average requirements of the proposed route at the time of year or else operational data (e.g. contrail detection or suppression data) from a previous flight of the route.

Figure 6:
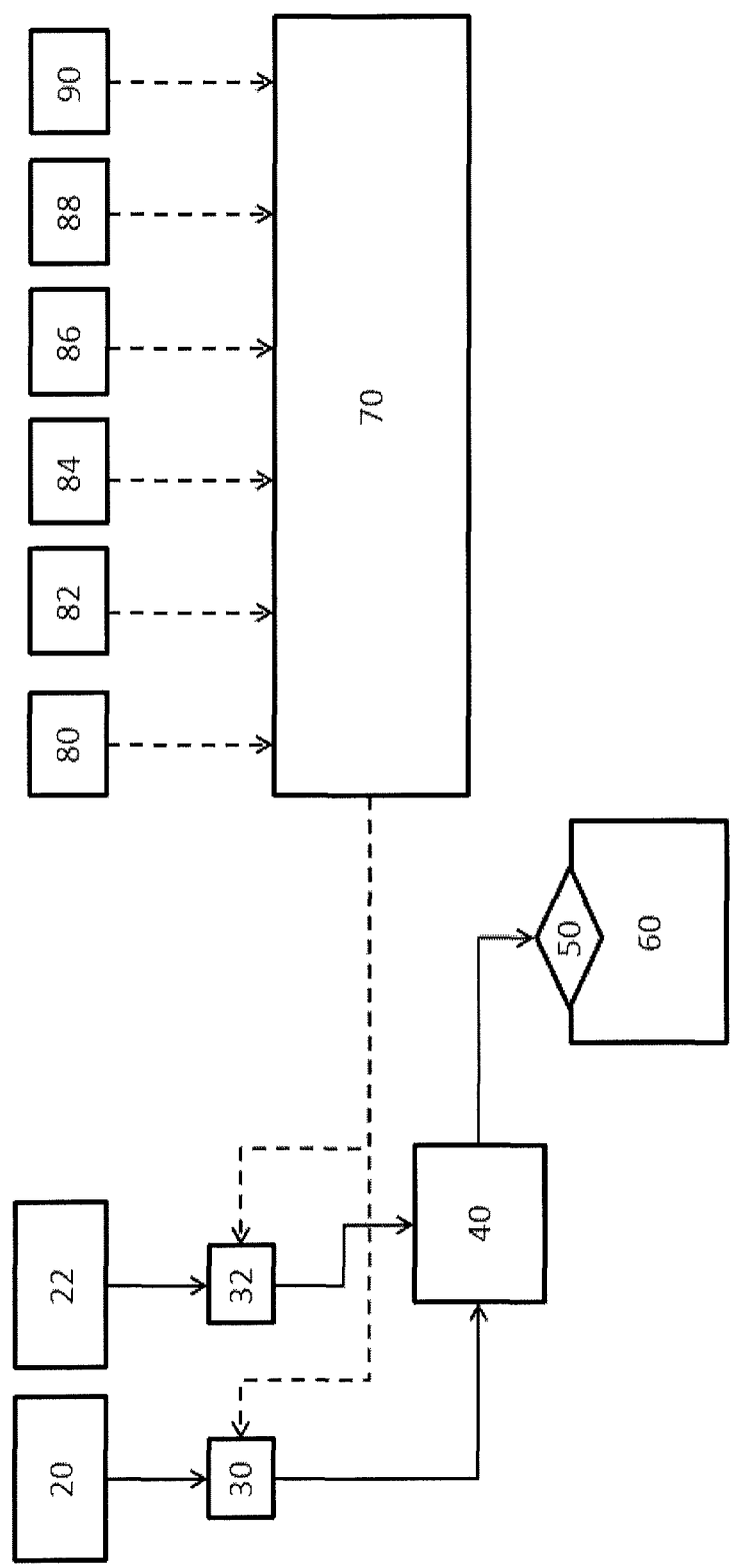
FIG. 6 shows a schematic layout of a system according to a first embodiment of the invention.

FIG. 6 shows the aircraft-mounted fuel-system corresponding to the first embodiment. Within the diagram, solid arrows indicate the flow of fluid, while dashed arrows indicate the flow of data or instructions.

Distinct sources 20 and 22 are provided the first and second fluid compositions respectively. A source of fluid composition may be a tank, or it may be a network of fluidly interconnected tanks. Each source of a distinct fluid composition is however fluidly isolated from sources of other distinct fluid compositions. Although the diagram shows two such sources (that being the most likely configuration for the sake of practicality of fuel delivery infrastructure), in general there could be any number (greater than 1) of distinct fluid compositions, each having its own source.

Discrete fluid flow regulators 30 and 32 are provided in respect of each distinct source 20, 22. Each regulator typically takes the form of an individually openable/closable valve arrangement under the control of the control unit. Thus the flow of fluid from each source is independently controllable.

A fluid blender 40 has inlets in fluid communication with each regulator valve 30, 32 and can thus receive varying ratios of fluid from each regulator concurrently, including the extreme of 100% flow from one regulator only. The regulators thus control the rate of flow of distinct fluid compositions into the blender 40. The relative rates of flow of the distinct fluid compositions determine the blending ratio and hence the relative proportions of the distinct fluid compositions within the final fuel composition.

The sum of the rates of fluid flow through the various regulators determines the total rate of flow of fuel into one or more aircraft engine.

The blender 40 blends the distinct fluid compositions together to produce a substantially homogeneous mixture corresponding to the final fuel composition. A conventional fluid mixing device may be used for this purpose, for example comprising a flow deflecting structure arranged to induce a flow regime which promotes mixing within the body of the blender 40 (e.g. passively), and/or one or more actuated mechanisms to actively mix the fluids. The blender may also comprise an outlet regulator in order to meter the mixed fuel to the engine(s) at the desired flow rate.

The final fuel composition is then supplied to a fuel injector 50 within engine 60. The diagram shows one engine with one fuel injector. In practice there may be more than one engine supplied by the fuel delivery system, and in general each engine may have more than one fuel injector.

The control unit 70 determines the relative proportions of the distinct fluid compositions that should be used within the final fuel composition. The control unit 70 instructs each regulator to admit its respective distinct fluid composition to the blender 40 at a rate corresponding to the desired prevalence of said distinct fluid composition within the final fuel composition, taking account also of the total fuel flow-rate required to meet operational demands of the aircraft (e.g. commanded from the cockpit). The control unit reaches its decision by taking account of data provided by or available from the sources of data 80, 82, 84, 86, 88, 90.

80 represents an array of sensors which provide information concerning sensor readings of ambient atmospheric conditions, specifically pressure p, temperature T and humidity (also known as water vapour pressure) e.

82 represents a policy concerning whether the system should endeavour to suppress all contrail formation, or alternatively whether the system should reserve its action to suppress only the formation of persistent contrails, which have a greater warming impact than non-persistent contrails. Additionally or alternatively the policy may refer to other decision criteria such as ambient air temperature and/or the strength of incoming sunlight. Optionally, the policy may specify a predetermined threshold value for one or more of its decision criteria, the predetermined threshold acting as a boundary which separates conditions in which action is not required from conditions in which action may be required.

Numeral 84 represents the total efficiency, q, of the engine(s) at its/their current operating condition(s).

86 is a data store comprising a lookup-table or database or other source of data representing the properties of each of the distinct fluid compositions. The properties represented in this data source will include a) $EIH_2O$, and b) specific energy Q. Also included may be information concerning aromatic content, density and other properties needed to ensure that any proposed blend of the distinct fluid compositions is compliant with the prevailing fuel specifications.

88 is a representation of other necessary data such as the specific heat capacity of air at constant pressure Cp, and the ratio $\epsilon$ of the molar masses of water and air.

90 is a control signal representative of the total fuel flow for each engine, e.g. dictated from the cockpit, whether by human pilot or autopilot.

The control unit receives the data inputs and employs the decision making process described above in relation to FIG. 4.

Figure 7:
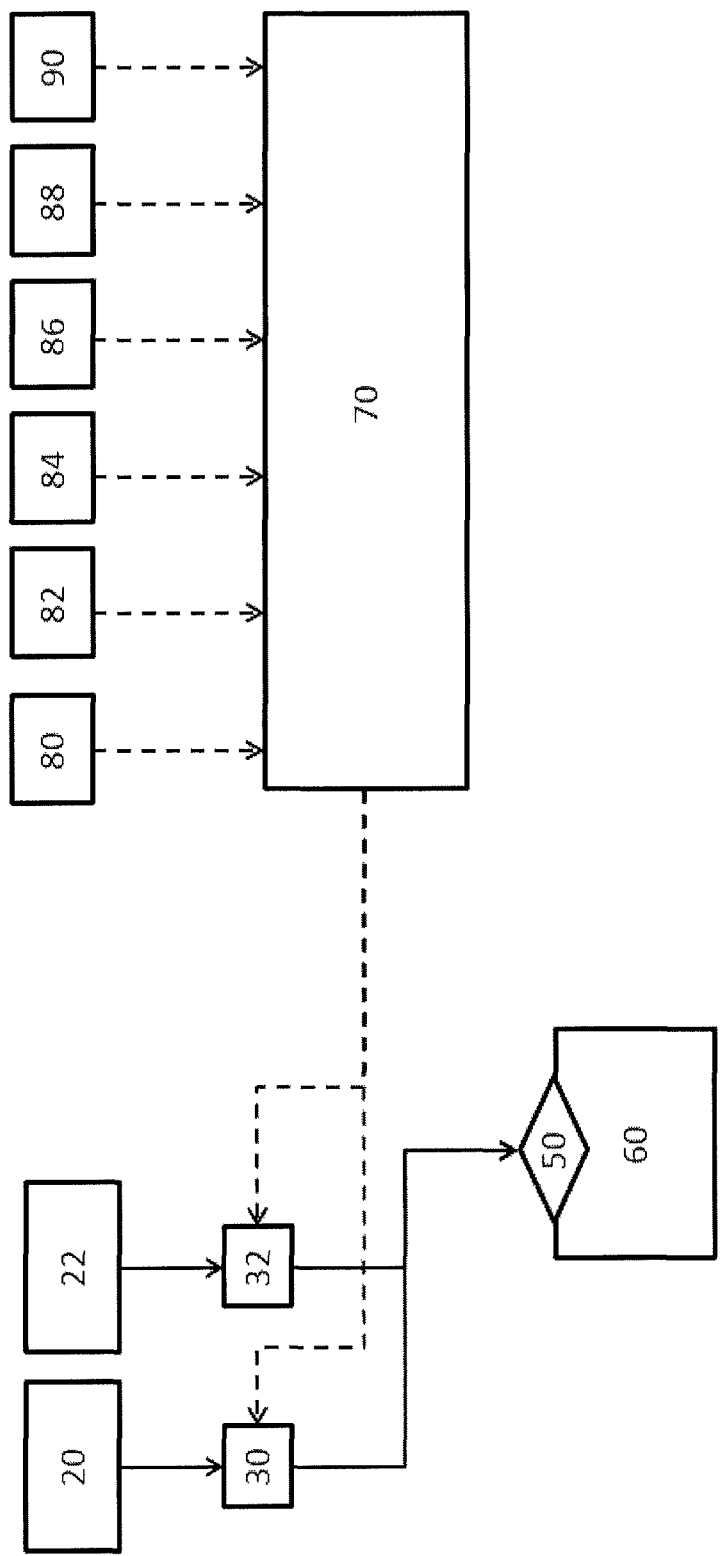
FIG. 7 shows a schematic layout of a system according to one example of a second embodiment of the invention.

FIG. 7 shows the first of two options for the second embodiment of the invention, which switches between fuel sources rather than blending the distinct fuel compositions. Accordingly, the blender 40 from FIG. 6 has been omitted. The components of the system are otherwise as described above. In this example, the controller 70 will actuate only one of the regulators 30,32 at once to admit its respective distinct fuel composition at any given time. The output from the regulators 30,32 is ducted directly to the engine fuel injector(s) 50. The control unit will instruct all but one of the regulators not to admit any of their respective distinct fuel compositions, and the remaining regulator is instructed to admit fuel at a rate corresponding to the fuel-flow rate commanded from for example the cockpit. Thus only one regulator may open at once to admit the full fuel flow required by the engine. The components of the system are otherwise as described above.

The decision making process employed within the control unit is as described for FIG. 5.

The arrangement of FIG. 7 could employ a chamber, at the location of blender 40 in FIG. 6. However the chamber in FIG. 7 would serve as a holding chamber merely to ensure a continuous fuel supply to the engine. The mixing chamber of FIG. 6 could be used for this purpose or a simplified enclosure.

Figure 8:
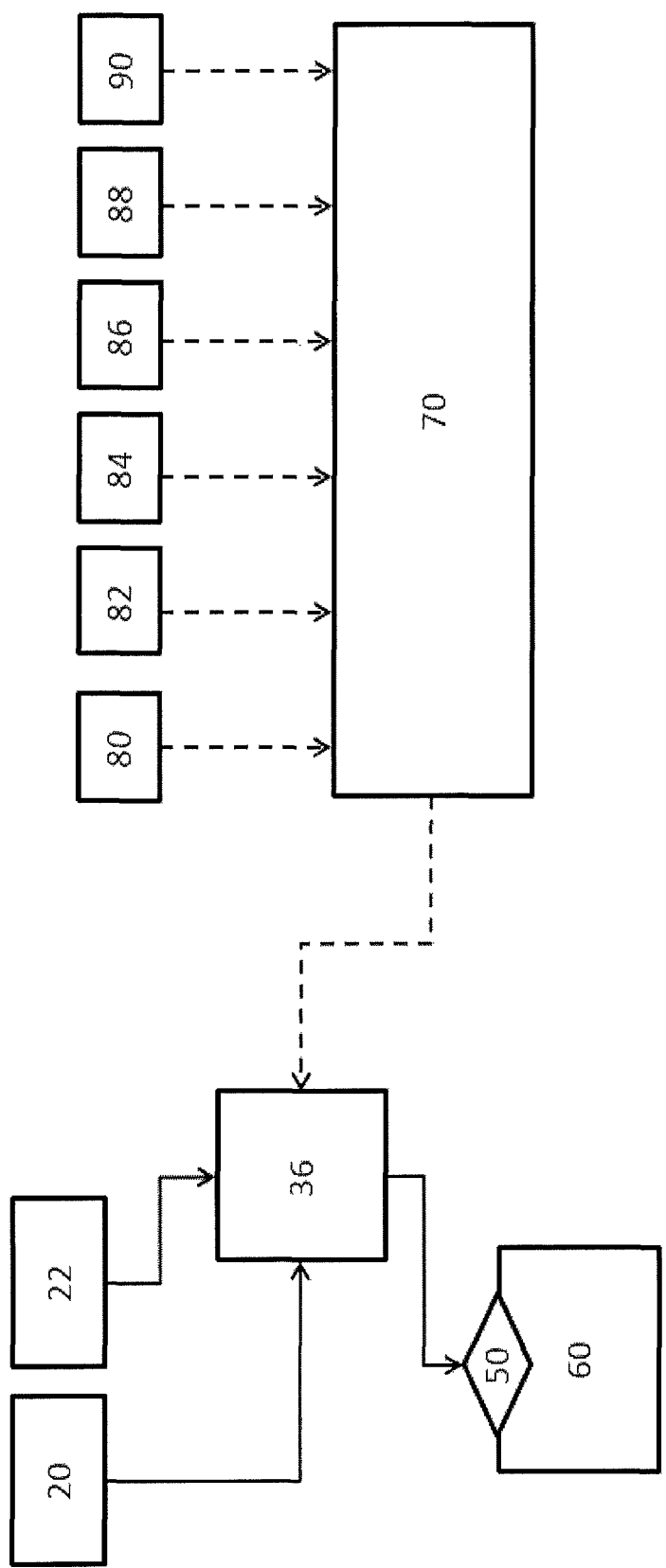
FIG. 8 shows a schematic layout of a system according to second example of a second embodiment of the invention.

FIG. 8 shows a second option for the second embodiment. In this second option there is a single regulator 36 which admits input from only one of the sources 20,22 of distinct fuel composition at any one time, at a rate corresponding to the fuel-flow rate commanded from the cockpit. The control unit 70 therefore issues a control signal to the regulator 36 specifying which of the distinct fuel compositions to admit and the total fuel flow-rate required. Thus the regulator 36 has a plurality of inlets (one for each fuel source). The output from the regulator 36 is piped to the engine fuel injector(s) 50 of one or a plurality of engines. The decision making process employed within the control unit is shown in FIG. 5. In the example in which one regulator feeds a plurality of engines, a central fuel system controller could determine a fuel composition to be applied to all engines simultaneously.

For the third embodiment, the aircraft may be fitted with one or more sensors for detecting contrail formation and/or ambient conditions. Accordingly flight data comprising such sensor readings may be recorded and communicated to a control centre or otherwise disseminated in order to allow calculations to be made of an optimal fuel composition be provided for subsequent flights by that aircraft or by other aircraft following the same or a similar route and/or part of a route.

Figure 9:
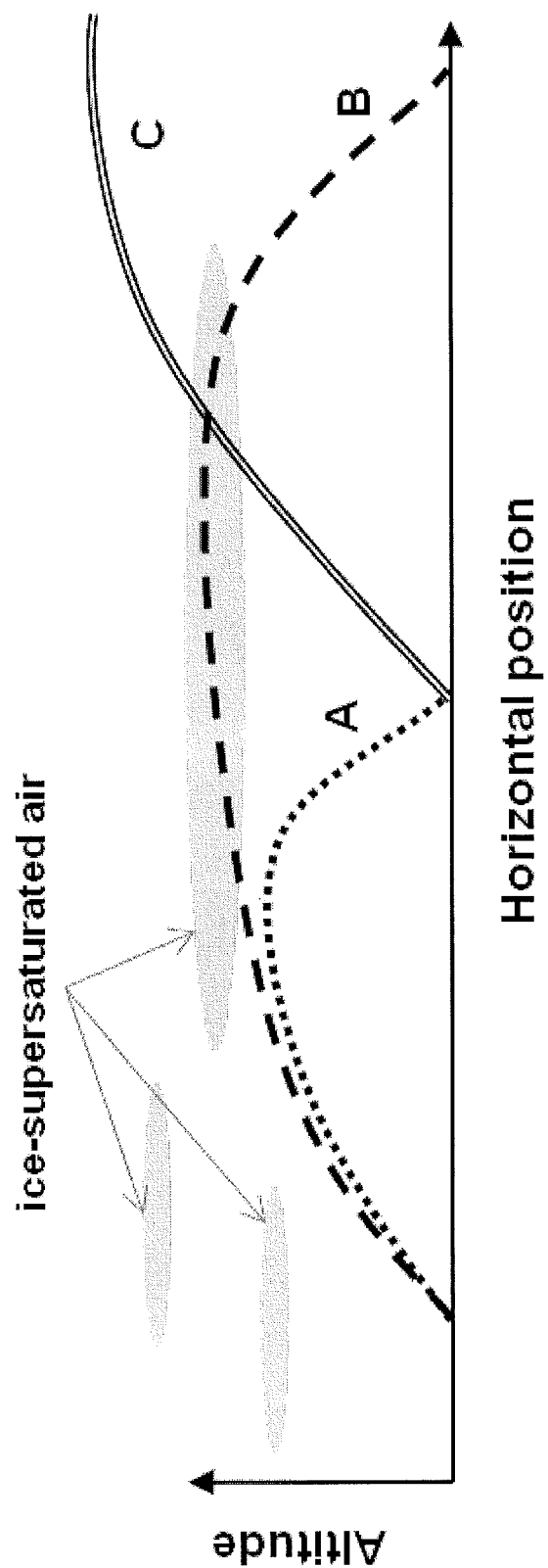
FIG. 9 shows plots of three different flight paths A, B and C relative to regions in which contrails can persist if they are allowed to form.

Turning now to FIG. 9 there is shown a schematic chart showing three different flight paths relative to known regions of ice-supersaturated (ISS) air, within which the longevity and hence climate impact of a contrail is significantly greater than in regions of non-ice-supersaturated air. The inhomogeneous spatial distribution of ISS air regions, coupled with the differing flight distances and altitude profiles of differing flights, implies a wide variation between individual flights in the proportion of flight time or flight distance that is conducted within ISS air.

By way of illustration, in FIG. 9 it can be seen for example that:
Flight A does not encounter ice-supersaturated (ISS) air at all
Flight B encounters ISS air for a large proportion of its route
Flight C encounters ISS air only briefly Thus there is a clear need to tailor the contrail suppression requirements for individual flights and to ensure that each flight is loaded with the correct ratio of low and high-aromatic fuels so as to achieve contrail suppression and LAQ-enhancement in the most cost-effective manner.

A proposed flight can beneficially be divided into a number of sections, each corresponding to an engine operating condition. For each operating condition, the contrail suppression requirement (or alternatively the LTO soot-suppression requirement) can be calculated in advance of the proposed flight (e.g. by a ground-based fuel delivery control unit or centre), using the same calculation methodology that is described above for implementation on the aircraft. Using the contrail suppression requirement (or LTO-soot-suppression requirement) the fuel blend ratio necessary to fulfil that requirement can be calculated for each operating condition (or if the requirement cannot be met then the default fuel composition is specified for that operating condition). The mass and/or volume of fuel required for that operating condition (according to expected thrust level and duration of the condition) is also calculated, taking account of the energy per unit mass and/or energy per unit volume of the proposed fuel composition. The system then performs a summation over the various operating conditions considered, to provide the total mass and/or volume of fuel of each of the available types which should be loaded onto the aircraft prior to the flight to accommodate the predicted operating conditions making up the flight.

It is proposed that the composition of the default fuel blend be determined after the volume of fuels for contrail-suppression requirements have been established. Similarly, the requirement for low-aromatic fuel blend during LTO may also be established prior to that of the default fuel composition. The composition for the default fuel can then be determined and communicated to the aircraft as an instruction to ensure that the aircraft uses the same default composition in flight.

An example of the pre-flight decision-making process may be as follows:
1. Consider the requirement for "low-aromatic" final fuel composition (used to improve local air quality).
   a. Calculate the volume of "low-aromatic" final fuel composition that will be required for the flight, taking account of:
   i. a predetermined usage policy that specifies which sections of the flight should be performed using "low-aromatic" fuel. For example the usage policy may specify that "low-aromatic" fuel should be used solely within the LTO cycle.
   ii. If relevant, airport specific features such as: the expected taxiing distance under main engine power; noise-preferential routes that may influence the fuel-burn within the LTO cycle; any other local air traffic control requirements, such as aircraft climb requirements or departure procedures, that influence throttle settings and/or aircraft configuration, with a resulting effect on fuel-burn on climb-out.
   iii. If relevant, any airline-specific procedures or behaviours, perhaps inferred from engine condition monitoring data, concerning typical throttle settings employed on the take-off roll.
   b. Calculate the required characteristics of the low-aromatic fuel blend:
   i. In the simplest case this will be composed entirely of the distinct fluid composition with the lowest aromatic content. However, some blending with other components may be required to meet fuel specification limits.
   ii. Optionally, account may also be taken of any airport-specific LAQ regulations that might place an upper bound on the allowable fuel aromatic content used within the airport's vicinity.
   c. Calculate the volumes of the distinct fluid compositions necessary to satisfy the low-aromatic fuel requirement.
2. Consider the requirement for high-aromatic final fuel compositions for the purposes of contrail suppression.
   a. Identify operating conditions in which contrail suppression will be required. An operating condition is distinguished from other operating conditions by a material change in ambient air properties (such as pressure and/or temperature and/or humidity) and/or in engine operating point (such as thrust level and/or total efficiency and/or forward velocity)
   b. For each distinct operating condition in which contrail suppression is required and is achievable with the available fluid compositions:
   i. Identify the final fuel composition which is just sufficient to suppress contrail formation.
   ii. Determine the total volume of that final fuel composition required to meet operating condition propulsion requirements
   iii. Determine the relative proportions of the distinct fluid compositions that will achieve the desired final fuel composition at minimum cost and/or environmental impact.
   iv. Determine the volumes of the distinct fluid compositions required to satisfy the fuel requirement for this operating condition
3. Determine the fuel requirements for any remaining operating conditions, i.e. to determine the required volume and characteristics of the default fuel composition. Optionally, the required volume of the default fuel composition may be calculated as the total volume of fuel required to perform the flight minus the volume of fuel calculated for the low-aromatic and high-aromatic regimes. Typically this calculation will also include any constraints on fuel properties due to instantaneous or average fuel composition thresholds. Additionally or alternatively this calculation will also include any constraints related to the availability of specific fuel compositions at the departure airport. The calculation will be carried out to determine the default fuel composition corresponding to the lowest cost solution over the flight as a whole. Additionally or alternatively the calculation will identify the default fuel composition which minimises the environmental impact over the flight as a whole.

4. For each distinct fluid composition, calculate the sum of the volumes of fluid determined in steps 1, 2, and 3 above, to yield the total requirement for this flight of that distinct fluid composition.

5. Optionally, the default fuel composition is communicated to the aircraft. In the absence of this step the aircraft-based fuel system calculates the default fuel composition for itself. In any event, the aircraft-based fuel system may choose to vary the default fuel composition as the flight progresses, to account for deviations from expected usage of the low-aromatic or high-aromatic compositions.

Figure 10:
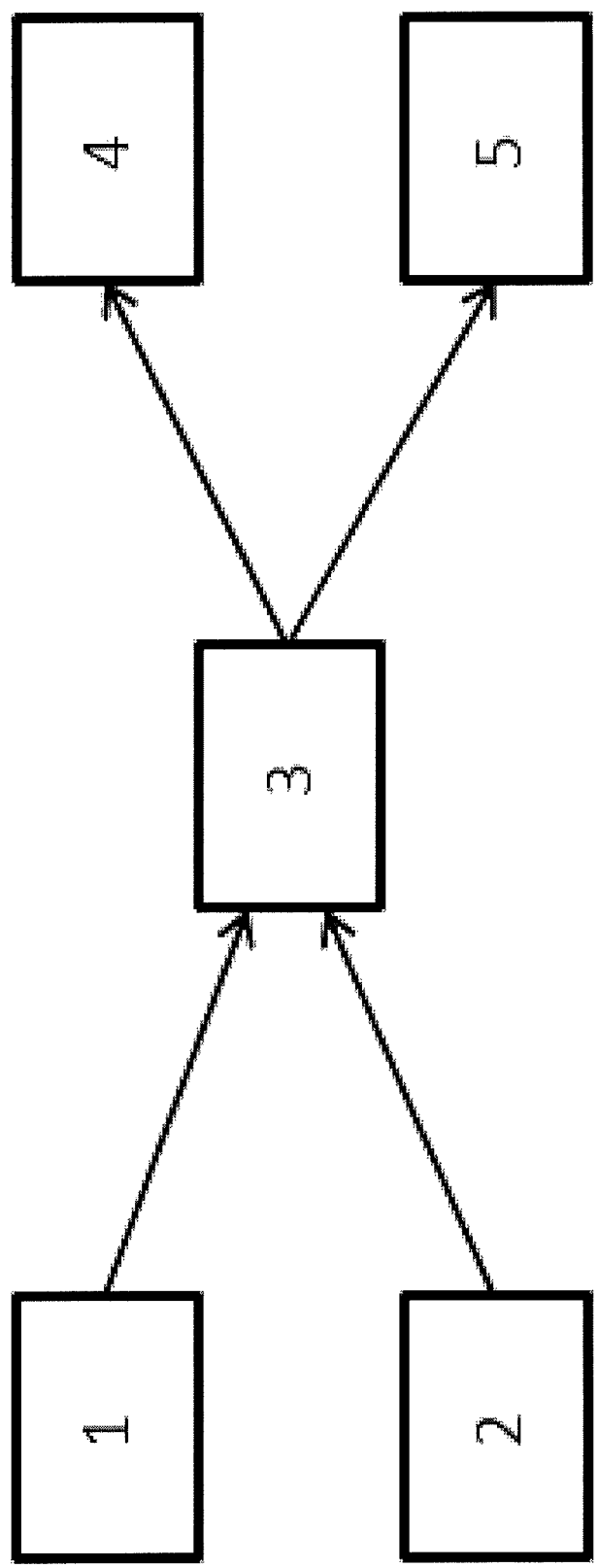
FIG. 10 shows the order of calculations performed prior to engine operation in order to ensure a correct fuel load is supplied.

FIG. 10 shows the orders in which the above calculations can be performed (i.e. the calculation dependency) for a ground-based fuel supply controller. The sequence may be carried out in the order described above. Alternatively, step 2 may optionally be performed before step 1 but step 3 will be performed after step 1 and 2. Steps 4 and 5 must be performed after step 3.

Using the above techniques, assessment can be made of the extent to which contrail suppression is required for the flight in question and thus a single fuel blend provided, comprising two or more discrete low-aromatic and high-aromatic components in a predetermined ratio that is optimised for the planned operating conditions over the course of the flight. Referring to FIG. 9 above, if the flight resembles flight A, in that it will not encounter ice-supersaturated (ISS) air at all, then no attempt is made to supply the aircraft with contrail-suppressing fuel, in other words the aircraft is supplied either with "standard" jet fuel, or alternatively with a lower-aromatic blend which will imbue the advantages of slightly lower fuel burn and soot emissions. If, on the other hand the flight is more akin to flight B in that it will encounter ISS air over a significant part of the flight, and if furthermore it is calculated that the aircraft will form contrails within that ISS air, then a high-aromatic fuel blend is used. In practice this blend would likely correspond to, or be close to, the maximum-permissible level of aromatic content (currently 25%) to ensure maximum contrail suppression effect. However, if the system was able to determine that an acceptable level of contrail suppression could be achieved at a lower level of aromatic content, this would be supplied instead, on the grounds that aromatic content has environmental disadvantages as described above.

The above-described first and second embodiments require access to accurate real-time data concerning ambient temperature, pressure, humidity and also the parameters necessary to infer engine total efficiency. It further assumes that fuel properties ($EIH_2O$ and specific energy) are known with sufficient accuracy. This may not be the case. Accordingly alternative approaches to implementing the first and second embodiments are set out below. In this alternative approach, the determination of the most appropriate fuel blend ratio is achieved based on observation of the presence or absence of a contrail rather than the conditions that produce contrails. Optionally, if ambient humidity data is available, the distinction between persistent contrail formation and non-persistent contrail formation can be made to restrict contrail suppression to persist contrails only.

Figure 11:
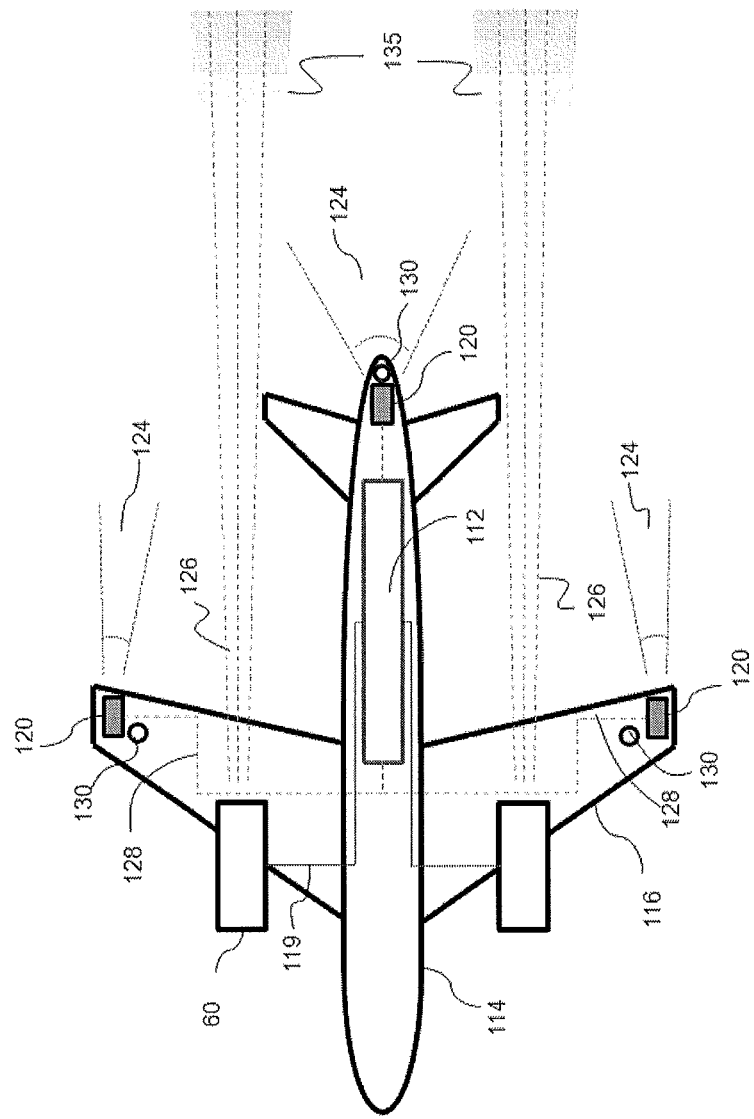
FIG. 11 shows a schematic plan view of an aircraft comprising a fuel delivery system according to a further embodiment of the invention.

With reference to FIG. 11 there is shown an aircraft incorporating a fuselage 114 and wings 116 (other geometric configurations such as "blended-wing-body" may also be contemplated without altering the invention materially). Under some circumstances a contrail 135 may form within the exhaust plume 126 behind an engine 60. Engines 60 are provided with fuel through fuel lines 119, the fuel composition being determined by and supplied by the fuel system 112, which comprises a control unit of the type described above. The hardware layout of the fuel system itself may be as shown in FIG. 6, 7 or 8 above.

However in this embodiment, the decision making within the fuel-system's control unit is informed by readings from a contrail detector 120, whose operation is optionally enhanced by a source of illumination 130. The contrail detector 120 is configured to respond to electromagnetic radiation reflected and/or re-emitted by a contrail 135 in response to the electromagnetic radiation emitted by the source of illumination 130 and incident upon the contrail 135. The contrail detector may also be configured to respond to electromagnetic radiation reflected and/or re-emitted by the contrail in response to ambient illumination (e.g. sunlight), or alternatively in response to infra-red (or other) illumination emitted by the hot exhaust of the engine 60. In other embodiments, instead of illumination, an emitter of sound (or ultrasonic) waves could be provided, which could comprise the sound generated by the engine in use. The sensor would then be configured to detect the sound returned from the ice particles in the young contrail.

The contrail detector 120 is configured to send to the fuel system 112 a signal indicative of the presence or absence of a contrail. The contrail detector may be mounted at the rear of the aircraft fuselage, or on the aircraft's empennage, or on the aircraft wing, or more generally anywhere on the aircraft where it has a field of view 124 that includes a region of the plume 126 in which a contrail 135 may be present. There may be more than one contrail detector 120 as shown in FIG. 11.

Optionally the contrail detection function may be performed by sensors mounted remotely e.g. at ground stations, on other aircraft or persistent air vehicles such as airships, or even on orbiting satellites. In such cases the function of the remote sensors may optionally be enhanced by the use of the aircraft mounted source of illumination 130, or alternatively through other sources of illumination mounted remotely, whether co-located with the remote sensors or not.

In all such examples, a signal conveying the presence or absence of a contrail is received by fuel system's control unit, which uses the signal to determine the final fuel composition supplied to the engines 60. Accordingly, with respect to FIGS. 6-8 the contrail detector provides an additional or alternative input to control unit 70 for deciding how to switch or blend on board fuel supplies for delivery to the engine.

Figure 12:
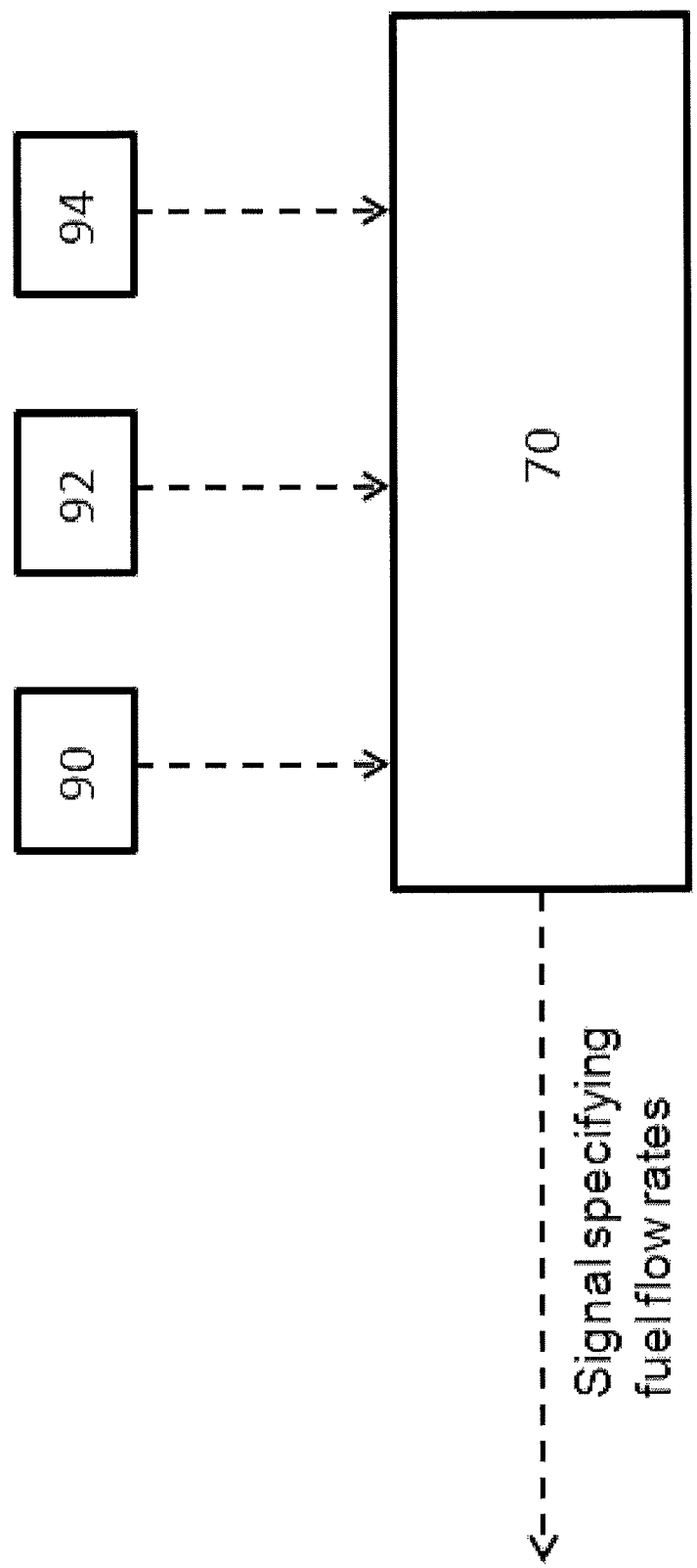
FIG. 12 shows a schematic of a control system according to a further example of the invention.

One example of such a control unit 70 is given in FIG. 12 which has the following inputs: a control signal 90 representative of the total fuel flow for the engine as commanded by the engine operational demands (e.g. from the cockpit, whether by human pilot or automated); a signal 92 which is supplied by the contrail detector 120 and indicates the presence or absence of contrail formation, typically comprising a Boolean indication (i.e. having only two states);

optionally (if available) a signal 94 indicative of whether or not ambient air is supersaturated with respect to ice, again typically comprising a Boolean indication. The control unit could optionally have an input of an ambient light detection signal. This could allow a decision as to whether or not to suppress contrail formation according to the potential environmental impact of the contrail.

For the first embodiment, (i.e. comprising a fuel blender on board) the output signal from the control unit 70 consists of n fluid flow rates, where n is equal to the number of distinct fluid compositions available for blending to produce the final fuel composition. The signals are sent to the regulators which then implement the fluid flow rates. The sum of the fluid flow rates equals the total fuel flow rate dictated by the engine operational demands.

For the second embodiment, (i.e. comprising switching-only between fuel sources) the same arrangement could be used, with the constraint that only one of the instructed fuel flow rates can be non-zero at any one time. Or alternatively the output could be a pair of values, one identifying which of the distinct fuel compositions should be used, and the other specifying the fuel flow rate.

The next step is to define the search/selection process that is used to determine the most appropriate final fuel composition which achieves the required contrail suppression action but at minimum cost and/or environmental impact. Before commencing the search procedure, the control unit 70 checks that contrail suppression is in fact required under the current operating condition in the manner described above. If for example the ambient air within the current operating condition is not supersaturated with respect to ice, and if the prevailing suppression policy specifies that only persistent contrails should be suppressed, then the default fuel composition is used, and the search process is abandoned until such time as there is a material change in operating conditions. If a measurement of the ambient humidity is not available, then this step is skipped. Additionally or alternatively, the ambient conditions may be tested against thresholds for other criteria such as ambient temperature and/or the strength of incoming sunlight. If, as a result of such tests, contrail suppression is deemed unnecessary within the current operating condition, then the default fuel composition is used, and the search process is abandoned until such time as there is a material change in operating conditions.

The system then implements briefly the default final fuel composition. If contrails do not appear as a result, no search is required, and so the search process is abandoned until such time as there is a material change in operating conditions.

Prior to commencing the search procedure, the control unit will also briefly implement a final fuel composition corresponding to the minimum achievable EIQ (i.e. maximum contrail-suppression effect), taking account of any constraints imposed e.g. by fuel specifications. If this does not result in contrail suppression then the invention will revert to the default fuel composition and abandon the search procedure until such time as there is a material change in operating conditions.

Between instructing a final fuel composition and observing the corresponding results in the exhaust plume there will be a delay which in the present disclosure is referred to as the contrail lead-time. The contrail lead-time is the time taken for the selected fuel composition to be delivered to the engine and for the associated combustion products to be exhausted and for the resulting presence or absence of a contrail to become observable and for the measurement or observation of the presence or absence of a contrail to be carried out. The contrail lead-time has implications for both of the above pre-search steps. Two strategies may be employed in response to this. Firstly the system could wait for the results to manifest themselves before deciding whether or not to move either to the next pre-search step or to the search itself. Alternatively, with knowledge of the magnitude of the contrail lead-time, the system could move to the next step, and then if necessary abandon the search procedure if, once the results of the pre-search steps become available, it transpires that contrail suppression either is not required or is not possible under the current operating conditions. Knowledge of the contrail lead-time is necessary to enable correct attribution of an observation made by the contrail detection sensor 120 at time, t, to the corresponding fuel blend ratio instructed to the regulators at time t minus the contrail lead-time.

The search/selection process then could proceed according to one of the following two options. Note that in either case the starting point of the search corresponds to a test final fuel composition, which is characterised by the minimum permissible or achievable EIQ. In either case the purpose of the search is to identify a final fuel composition corresponding to the maximum value of EIQ that will still result in contrail suppression.

Figure 13:
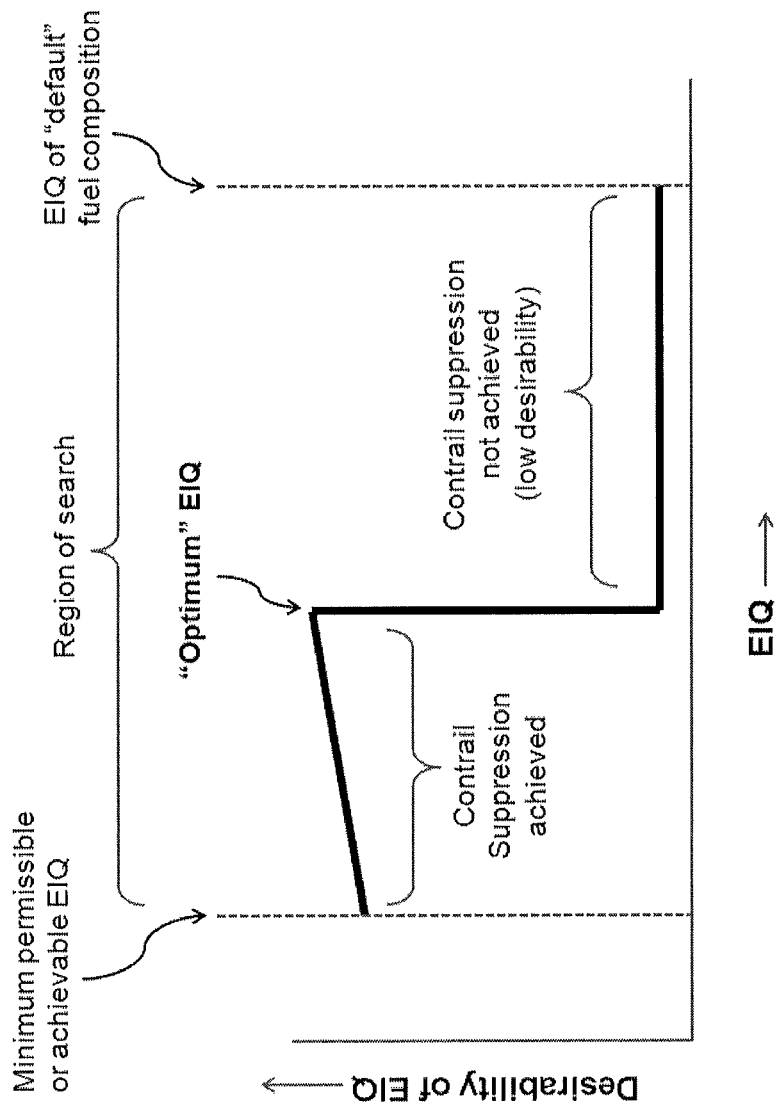
FIG. 13 shows a plot of the desirability of a range of values of a fuel property employed by an example the invention.

1. Option 1 applies an off-the-shelf search algorithm or function optimisation algorithm to the one-dimensional space defined by the allowable and achievable values of EIQ of the final fuel composition. Advantageously, the function optimisation algorithm is selected so as not to need information concerning the gradient of the function it is configured to optimise. Additionally or alternatively, the function optimisation algorithm is advantageously chosen so as to require a relatively small number of function evaluations.

a. The search interval is defined as that spanned by the EIQ values of respectively 1) the test final fuel composition, and 2) the default final fuel composition.

b. The search algorithm will try candidate points lying within the search interval, gradually converging on a value of EIQ that optimises the "objective function" defined below.

c. The objective function is evaluated by assessing the desirability of the trial EIQ specified by the search algorithm. This assessment of desirability involves two aspects, which when combined yield a function of the form illustrated in FIG. 13. Firstly, the proposed EIQ is implemented in practice and the contrail detector 120 advises whether contrail suppression is achieved (or not) at this EIQ. Clearly if contrail suppression is not achieved, then the level of desirability of the proposed EIQ is extremely low, irrespective of the EIQ's actual value. Secondly, assuming contrail suppression is achieved, the proposed EIQ is allocated a score which reflects its value (higher being better, with the aim of avoiding unnecessarily high aromatic content wherever possible).

d. Each time a trial EIQ is implemented, a delay equal to the contrail lead-time is incurred, since the search algorithm must ascertain the level of desirability of its proposed EIQ in order to decide which trial value of EIQ to propose next.

2. Alternatively, rather than using a search algorithm which minimises the number of function evaluations by iteratively selecting trial values of EIQ based on the desirability of prior trial values of EIQ, a simpler approach may be to sweep through the search space. In this simpler case, since the contrail lead-time is known, there is no need to wait for the results of one trial value of EIQ to manifest themselves in the exhaust plume before evaluating the desirability of another value of EIQ. As such, the next attempted value of EIQ is not influenced by the level of desirability of any previously explored values of EIQ. Instead, the output of the contrail detection sensor at time t is monitored and correlated with EIQ value applying at time "t minus contrail lead-time". In this way a fairly rapid sweep of the search space can be performed, to identify the optimal value of EIQ. The sweep starts at the left-hand side of the search region illustrated in FIG. 13, and continues until contrail suppression no longer occurs. Alternatively the sweep starts at the right-hand side of the search region illustrated in FIG. 13, and continues until contrail suppression is achieved. Advantageously, a sweep starting at the left hand side of the of the search region illustrated in FIG. 13 would be characterised by a lower climate warming impact since contrail suppression would be achieved throughout the sweep. At this point, the best value obtained during the sweep is implemented and retained.

Whichever of the above two search processes is used, for each EIQ specified during the search process we must identify the most appropriate fuel blending ratio of the distinct fluid compositions which will allow us to implement that trial value of EIQ. This is performed as described above in section 5, selecting the blending ratio that corresponds to minimum cost and/or environmental impact given the requirement to achieve a particular EIQ.

According to aspects of the invention, each time the system determines that a change in fuel composition is required relative to the fuel composition currently/previously supplied to the engine, a controller (e.g. control unit 70) may determine a difference in specific energy between the current and new/proposed fuel compositions. If a difference is determined, the controller may output control instructions to adjust the flow rate of the proposed/new fuel composition, e.g. relative to the current composition flow rate, when delivered to the engine to maintain the same rate of fuel energy input to the engine. Thus the same level of thrust can be delivered by the engine despite the change in fuel composition being supplied. Whilst the changes in specific energy by use of the invention are envisaged to be relatively small, such a check may be important in assuring safety and predictable ongoing engine operation. Accordingly such a feature may be generally applicable to any of the embodiments described above.

In summary, according to various aspects of the invention, there are described above a number of methods for adjusting the composition of fuel supplied to an engine to influence the ratio of water-to-heat added to the exhaust plume, so as to suppress the formation of contrails.

In any of the examples of the invention described above, a first of the plurality of fuel compositions provided is different to a second fuel composition. The principal difference relates to the level of aromatic or other non-paraffinic content within the respective fuel compositions. In one example the first fuel composition is Kerosene. Additionally or alternatively the second fuel composition is a biofuel. The second fuel composition may be a low-soot-producing (LSP) or alternatively a low-sulphur, low-soot-producing (LSLSP) fuel. Alternatively or additionally the second fuel may be a blend of several such LSP and/or LSLSP fuels whose physical and chemical properties render it suitable for use in an engine in combination with the first fuel composition, for example as an aviation fuel when blended with conventional kerosene. Examples include (but are not limited to) coal-to-liquids (CTL), gas-to-liquids (GTL), biomass-to-liquids (BTL), synthetic paraffinic kerosene (SPK), hydrotreated renewable jet-fuel (HRJ), alcohol-to-jet, and Hydro-processed Esters and Fatty Acids (HEFA).

While the invention has been described in conjunction with the exemplary embodiments described above, many equivalent modifications and variations will be apparent to those skilled in the art when given this disclosure.

For example, decision factors in the contrail suppression policy described above could, in addition to or instead of contrail persistence, take account of other indications of contrail climate warming impact, such as ambient air temperature and/or the strength of incoming sunlight over the expected lifetime of the contrail. One or more temperature and/or light sensor would typically be provided for such embodiments.

For example, instead of blending the distinct fluid compositions into a final fuel composition which is then supplied to the engine, there could be two or more distinct fuel pipes leading to the engine, with the distinct fuel compositions remaining separate until introduced to the engine itself, as might be necessary if for example one of the distinct fuel compositions was liquefied natural gas (LNG). In such an arrangement the function of the blender could for example be performed by turbulence within the engine's combustion chamber.

For example, instead of using fuel aromatic content as the principle distinguishing characteristic between the various distinct fluid compositions, instead other combinations of fuels could be used. Such fuels would differ from each other with respect to their respective EIQ values (EIQ being the amount of water produced per unit of energy released from combustion of the fuel), but the source of the difference would not necessarily be related to the aromatic content of the fuels. Additionally or alternatively, such fuels would differ from each other with respect to the mass and/or number density of soot produced per unit mass of fuel burned and/or per unit volume of fuel burned and/or per unit of energy released from combustion of the fuel. Additionally or alternatively, such fuels would differ from each other with respect to the mass and/or number density of other undesirable emissions produced per unit mass of fuel burned and/or per unit volume of fuel burned and/or per unit of energy released from combustion of the fuel.

The invention claimed is:

1. A method of delivering a fuel to an aircraft engine, comprising:
providing a plurality of distinct fuel sources, a first fuel source comprising a first fuel having a first aromatic content and a second fuel source comprising a second fuel having a second aromatic content;
determining one or more ambient atmospheric conditions for at least a portion of a flight path of an aircraft, said one or more ambient atmospheric conditions being indicative of a likelihood of contrail formation by the aircraft engine;
determining a desirous fuel composition for suppressing contrail formation for combustion by the aircraft engine based upon said one or more ambient atmospheric conditions by applying a predetermined threshold value of a fuel property for the desirous fuel composition, the threshold value comprising an average value of said fuel property over an instance or period of use of the aircraft engine;
selecting a ratio of the first and second fuels from said first and second fuel sources according to said desirous fuel composition for suppressing contrail formation; and delivering said selected ratio of the first and second fuels to the aircraft engine.

2. A method according to claim 1, wherein the determining of the desirous fuel composition for suppressing contrail formation comprises determining a desirous aromatic content of the desirous fuel composition for suppressing contrail formation for delivery to the aircraft engine.

3. A method according claim 1, wherein the average value comprises an average lower threshold value, such that an instantaneous value of said fuel property is permitted to fall below said average lower threshold value provided the average value is equal to or greater than said threshold value.

4. A method according to claim 1, wherein the determining of the desirous fuel composition for suppressing contrail formation comprises applying a plurality of predetermined threshold values of the fuel property for the desirous fuel composition for suppressing contrail formation and determining a default fuel composition within said predetermined threshold values, wherein in the event that the desirous fuel composition for suppressing contrail formation by the aircraft engine falls outside of said predetermined threshold values, the default fuel composition is selected.

5. A method according to claim 1, wherein the plurality of distinct fuel sources are provided prior to flight and the determining of the one or more ambient atmospheric conditions comprises determining one or more actual ambient conditions or predicting one or more ambient conditions for a proposed flight path.

6. A method according to claim 5, wherein the first and second fuels are blended prior to delivery of the desirous fuel composition for suppressing contrail formation to one or more tank on the aircraft.

7. A method according to claim 1, wherein the determining of the desirous fuel composition for suppressing contrail formation comprises determining a ratio of the mass of water produced by burning a unit volume/mass of fuel to the energy released from burning said unit volume/mass of fuel.

8. A method according to claim 7, wherein the determining of the desirous fuel composition for suppressing contrail formation comprises determining a threshold ratio of the mass of water produced by burning a unit volume/mass of fuel to the energy released from burning said unit volume/mass of fuel, said threshold ratio being a threshold for non-formation of contrails under the determined ambient atmospheric conditions.

9. A method according to claim 1, wherein the first aromatic content is relatively lower than the second aromatic content, wherein a volume of the first fuel is calculated for delivery to the aircraft engine to satisfy one or more operational parameters of the aircraft engine other than contrail suppression and a volume of the second fuel is calculated for delivery to the aircraft engine to satisfy contrail suppression.

10. A method according to claim 9, wherein the one or more operational parameters of the aircraft engine other than contrail suppression comprise one or more aircraft engine performance parameters or the reduction of one or more aircraft engine exhaust pollutants.

11. A method according to claim 9, wherein the volumes of the first and second fuels are calculated for the duration of a planned instance of use of the aircraft engine and contrail suppression and/or the one or more operational parameters of the aircraft engine other than contrail suppression are varied according to a flight phase or an altitude of the aircraft.

12. A method according to claim 9, wherein a volume of the default fuel composition for a flight is determined after determination of the volumes of the first and second fuels required and wherein the total volume of fuel determined for the flight comprises a summation of the determined volumes of the first, second and default fuel compositions.

13. A method according to claim 12, wherein the default fuel composition comprises a default ratio of the first and second fuels.

* * * * *